US012621602B2

(12) United States Patent
Corynen

(10) Patent No.: US 12,621,602 B2
(45) Date of Patent: May 5, 2026

(54) LOUDSPEAKER ASSEMBLY FOR HEADREST

(71) Applicant: PSS BELGIUM NV, Dendermonde (BE)

(72) Inventor: David Corynen, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 139 days.

(21) Appl. No.: 18/700,300

(22) PCT Filed: Nov. 4, 2022

(86) PCT No.: PCT/EP2022/080799
§ 371 (c)(1),
(2) Date: Apr. 11, 2024

(87) PCT Pub. No.: WO2023/083711
PCT Pub. Date: May 19, 2023

(65) Prior Publication Data

US 2024/0414474 A1 Dec. 12, 2024

(30) Foreign Application Priority Data

Nov. 10, 2021 (GB) ..................................... 2116175

(51) Int. Cl.
*H04R 1/24* (2006.01)
*H04R 1/02* (2006.01)
*H04R 1/34* (2006.01)

(52) U.S. Cl.
CPC ............. *H04R 1/345* (2013.01); *H04R 1/023* (2013.01); *H04R 1/025* (2013.01); *H04R 1/24* (2013.01)

(58) Field of Classification Search
CPC ........ H04R 1/345; H04R 1/023; H04R 1/025; H04R 1/24
See application file for complete search history.

(56) References Cited

U.S. PATENT DOCUMENTS 5,887,071 A 3/1999 House
10,160,399 B1 * 12/2018 Scalisi .................... H04R 5/02
(Continued)

FOREIGN PATENT DOCUMENTS

GB 2595318 A 11/2021
JP H05347791 A 12/1993
(Continued)

OTHER PUBLICATIONS

ISA/EPO, International Search Report and Written Opinion for International Patent Application No. PCT/EP2022/080799, mailed Feb. 21, 2023, 12 pages.
(Continued)

*Primary Examiner* — Suhan Ni
(74) *Attorney, Agent, or Firm* — NK Patent Law

(57) ABSTRACT

A loudspeaker assembly is disclosed that includes a headrest having a front face and a rear face; a bass dipole loudspeaker mounted to the headrest, wherein the loudspeaker includes a diaphragm having first and second radiating surfaces, wherein the radiating surfaces are located on opposite faces of the diaphragm, wherein the diaphragm moves at bass frequencies such that the radiating surfaces produce sound; a bass waveguide to guide bass produced by the first radiating surface via a forward-facing opening provided by the waveguide, wherein the loudspeaker is mounted such that bass produced by the second radiating surface propagates out from the rear face and such that the first radiating surface is closer to the rear face than to the front face. The forward-facing opening is larger than the first radiating surface as projected onto a plane perpendicular to a movement axis of the loudspeaker.

15 Claims, 18 Drawing Sheets

(56) References Cited

U.S. PATENT DOCUMENTS

| | | | | |
|---|---|---|---|---|
| 2009/0257616 | A1 | 10/2009 | Kaneda | |
| 2015/0201260 | A1 | 7/2015 | Oswald | |
| 2020/0247295 | A1 | 8/2020 | Manista | |
| 2021/0168504 | A1* | 6/2021 | Corynen | H04R 1/2826 |
| 2022/0159396 | A1* | 5/2022 | Fryer | H04R 5/02 |
| 2022/0225018 | A1* | 7/2022 | Hayasaka | H04R 1/025 |
| 2023/0117408 | A1* | 4/2023 | Vuine | H04R 1/025 381/398 |

FOREIGN PATENT DOCUMENTS

| | | | |
|---|---|---|---|
| JP | 2008188099 | A | 8/2008 |
| WO | 2019121266 | A1 | 6/2019 |
| WO | 2019192816 | A1 | 10/2019 |
| WO | 2021116301 | A1 | 6/2021 |
| WO | 2021185777 | A1 | 9/2021 |
| WO | 2021249843 | A1 | 12/2021 |
| WO | 2022048810 | A1 | 3/2022 |
| WO | 2022048956 | A1 | 3/2022 |
| WO | 2023030847 | A1 | 3/2023 |
| WO | 2023083711 | A1 | 5/2023 |
| WO | 2023174574 | A1 | 9/2023 |

OTHER PUBLICATIONS

Kippel, et al., University of Technology Dresden, "Dynamical Measurement of the Effective Radiating area SD", no date, [Retrieved from the Internet on Mar. 26, 2024], <URL: https://www.klippel.de/fileadmin/klippel/Files/Know_How/Application_Notes/AN_32_Effective_Radiation_Area.pdf>, 9 pages.

ISA/EP, International Search Report and Written Opinion for corresponding International Patent Application No. PCT/EP2024/050955, mailed Mar. 27, 2024, 12 pages.

* cited by examiner

Config. #1

LOUDSPEAKER ASSEMBLY FOR HEADREST

CROSS-REFERENCE TO RELATED APPLICATIONS

This application is a U.S. National Phase Application of International Patent Application No. PCT/EP2022/080799, filed 4 Nov. 2022, which claims priority to United Kingdom Patent Application No. GB2116175.7, filed 10 Nov. 2021.

FIELD OF THE INVENTION

The present invention relates to a loudspeaker assembly.

BACKGROUND

A dipole loudspeaker can be understood as a loudspeaker whose diaphragm has a first radiating surface and a second radiating surface, wherein the first radiating surface and the second radiating surface are located on opposite faces of the diaphragm, wherein a drive unit of the dipole loudspeaker is configured to move the diaphragm such that the first and second radiating surfaces produce bass sound which projects outwardly in opposite directions from the dipole loudspeaker.

It is known to incorporate a bass dipole loudspeaker in a headrest for the purpose of producing highly localised sound, see for example:

- WO2019/121266, which discloses a bass dipole loudspeaker suitable for incorporating into a car headrest;
- PCT/EP2021/064765, which discloses another bass dipole loudspeaker suitable for incorporating into a car headrest;
- PCT/EP2021/068397, which discloses another bass dipole loudspeaker suitable for incorporating into a car headrest;
- WO2021/185777, which discloses a mid-high frequency loudspeaker suitable for incorporating into a car headrest alongside a bass dipole loudspeaker;
- GB2112473.0, which discloses another mid-high frequency loudspeaker suitable for incorporating into a car headrest alongside a bass dipole loudspeaker.

The present invention has been devised in light of the above considerations.

SUMMARY OF THE INVENTION

In a first aspect, the present invention provides:

A loudspeaker assembly including:

- a headrest having a front face facing in a forwards direction and a rear face facing in a rearwards direction, wherein the rearwards direction is opposite to the forwards direction, wherein the headrest is for use with a user's head located in front of the front face of the headrest;
- a bass dipole loudspeaker mounted to the headrest, wherein the bass dipole loudspeaker includes a drive unit and a diaphragm, wherein the diaphragm has a first radiating surface and a second radiating surface, wherein the first radiating surface and the second radiating surface are located on opposite faces of the diaphragm, wherein the drive unit is configured to move the diaphragm at bass frequencies such that the first and second radiating surfaces produce sound at bass frequencies;

- a bass waveguide configured to guide bass sound produced by the first radiating surface out from the front face of the headrest via at least one forward-facing opening provided by the bass waveguide, wherein the bass dipole loudspeaker is mounted to the headrest such that bass sound produced by the second radiating surface is able to propagate out from the rear face of the headrest;
- wherein the bass dipole loudspeaker is mounted to the headrest such that the first radiating surface of the diaphragm is, when the diaphragm is at rest, closer to the rear face of the headrest than to the front face of the headrest;
- wherein the area of the at least one forward-facing opening is larger than the area of the first radiating surface as projected onto a plane perpendicular to a movement axis of the bass dipole loudspeaker.

As explained in more detail below, the combination of mounting the bass dipole loudspeaker towards the rear face of the headrest (such that the first radiating surface of the diaphragm is, when the diaphragm is at rest, closer to the rear face of the headrest than to the front face of the headrest), together with the bass waveguide having a large forward-facing opening area (that is larger than the area of the first radiating surface as projected onto a plane perpendicular to a movement axis of the bass dipole loudspeaker) helps to increase the sound pressure level (SPL) that can be produced by the bass dipole loudspeaker before a user whose head is located in front of the front face of the headrest experiences what is referred to herein as "tactile fizzle".

Herein, "tactile fizzle" refers to a tactile sensation experienced by a user whose head is close to the front face of a headrest incorporating a bass dipole loudspeaker, which can be experienced as a quickly oscillating blowing sensation. As explained in more detail below, and without wishing to be bound by theory, the present inventor believes "tactile fizzle" is caused by high air particle velocity speeds which can be perceived by a user when the SPL produced by the bass dipole loudspeaker exceeds a certain threshold (see FIG. 3*a*). A user who perceives "tactile fizzle" may find the effect distracting or unpleasant.

Because a loudspeaker assembly according to the first aspect of the present invention is able to increase the SPL that can be produced by the bass dipole loudspeaker before a user whose head is located in front of the front face of the headrest experiences what is referred to herein as "tactile fizzle", the user is able to enjoy larger SPLs prior to experiencing "tactile fizzle". This may help to provide an improved listening experience.

The movement axis of a bass dipole loudspeaker may be understood as an axis along which the drive unit is configured to move the diaphragm when the bass dipole loudspeaker is in use.

The bass frequencies at which the drive unit is configured to move the diaphragm preferably include frequencies across the range 60-80 Hz, more preferably frequencies across the range 50-100 Hz, more preferably frequencies across the range 40-100 Hz, and may include frequencies across the range 40-160 Hz. The drive unit may be configured to move the diaphragm at frequencies that do not exceed 250 Hz, 200 Hz, or even 160 Hz, in order to ensure the loudspeaker achieves a desired level of "cocooning", as described in WO2019/121266A1.

Moving the diaphragm at frequencies below 40 Hz may be useful for some applications, but not for others (such as in a car, where below 40 Hz background noise tends to be too loud).

Herein, the term "forwards-facing" may be taken to mean facing in the forwards direction.

Herein, the term "rearwards-facing" may be taken to mean facing in the rearwards direction.

The forwards direction may be parallel to a movement axis of the bass dipole loudspeaker. However, it is also possible for the movement axis of the diaphragm to be inclined with respect to the forwards direction (which may be the case e.g. if there are two bass dipole loudspeakers, which may have movement axes which are independently inclined at a small angle, e.g. an angle <20 degrees, with respect to the forwards direction).

The front face of the headrest may be understood to mean a face of the headrest that is on an outermost surface of the headrest and which faces in the forwards direction.

The rear face of the headrest may be understood to mean a face of the headrest that is on an outermost surface of the headrest and which faces in the rearwards direction. If the bass dipole loudspeaker is mounted at the rear face of the headrest, then the bass dipole loudspeaker may provide part or all of the rear face of the headrest (see e.g. FIG. 11*a*).

The first radiating surface may be determined to be closer to the rear face of the headrest than to the front face of the headrest if the shortest distance from the first radiating surface to the front face of the headrest (e.g. in a direction parallel to the forwards direction) is larger than the shortest distance from the first radiating surface to the rear face of the headrest (e.g. in a direction parallel to the forwards direction).

The area of the first radiating surface of the bass dipole loudspeaker as projected onto a plane perpendicular to a movement axis of the bass dipole loudspeaker may be 50 $cm^2$ or more, more preferably 60 $cm^2$ or more, more preferably 80 $cm^2$ or more, more preferably 90 $cm^2$ or more, more preferably 100 $cm^2$ or more.

If there is more than one bass dipole loudspeaker included in the loudspeaker assembly (see below), the sum of the areas of each first radiating surface of a respective bass dipole loudspeaker as projected onto a respective plane perpendicular to a respective movement axis of that respective bass dipole loudspeaker may be 50 $cm^2$ or more, more preferably 60 $cm^2$ or more, more preferably 80 $cm^2$ or more, more preferably 90 $cm^2$ or more, more preferably 100 $cm^2$ or more.

With areas in these ranges, an effective personal sound cocoon at bass frequencies can be achieved for reasons that can be understood from WO2019/121266A1.

In some examples, the term "area of the first radiating surface as projected onto a plane perpendicular to a movement axis of the bass dipole loudspeaker" may be replaced with "effective radiating surface area of the first radiating surface of the bass dipole loudspeaker".

As is known in the art, for a diaphragm having a circular perimeter which is suspended from a loudspeaker support structure by a roll suspension having an outer diameter do and an inner diameter di (e.g. such as the diaphragm of bass dipole loudspeaker 820*b* shown in FIG. 12), the effective radiating surface area of a radiating surface of that diaphragm may be estimated as $$S_D = \pi\left(\frac{d}{2}\right)^2,$$

where d is the half-diameter of the roll suspension, $(d_o+d_i)/2$.

Alternatively, or for more complex diaphragm geometries, the effective radiating area of the diaphragm SD may be measured using known techniques, see e.g. "Dynamical Measurement of the Effective Radiating area SD", Klippel GmbH (https://www.klippel.de/fileadmin/klippel/Files/Know_How/Application_Notes/AN_32_Effective_Radiation_Area.pdf).

Although it is possible to replace the term "area of the first radiating surface as projected onto a plane perpendicular to a movement axis of the bass dipole loudspeaker" with "effective radiating surface area of the first radiating surface of the bass dipole loudspeaker", it may be preferable not to make this replacement, to avoid complex calculations regarding effective radiating surface area (since the two areas are, in practice, similar to each other, and therefore essentially the same considerations apply).

For avoidance of any doubt, the bass waveguide might in some examples be configured to guide bass sound produced by the second radiating surface, but this need not be the case, since the bass dipole loudspeaker may, for example, be mounted at the rear face of the headrest such that bass sound produced by the second radiating surface is able to propagate out from the headrest in the rearwards direction, without the bass waveguide performing any guiding of the bass sound produced by the second radiating surface (see e.g. FIG. 11*a*).

In some examples, the headrest may include one or more mounting pins for mounting the headrest to a seat. If the headrest includes one or more mounting pins, the bass dipole loudspeaker is preferably mounted to the headrest in a position that is rearwards of the one or more mounting pins. Preferably, the bass dipole loudspeaker is mounted to the headrest in a position that is entirely rearwards of the one or more mounting pins, e.g. such that the one or more mounting pins are located between the entire bass dipole loudspeaker and the front face of the headrest. But it is also possible for the bass dipole loudspeaker to be mounted to the headrest in a position that is only partially rearwards of the one or more mounting pins (see e.g. FIG. 10*a*).

Preferably, the mounting pins and bass dipole loudspeaker are arranged such that the mounting pins prevent the bass dipole loudspeaker from moving forwards into the head of a user in a crash event (which may be applicable if the headrest is for use in a seat in a vehicle, such as a car). This safety feature may be enhanced if there are two mounting pins, and the bass dipole loudspeaker is wider than the distance between the two mounting pins, e.g. at a location rearwards of the mounting pins.

In some examples, the bass dipole loudspeaker may be mounted at the rear face of the headrest, e.g. with the bass dipole loudspeaker forming part of the rear face of the headrest (see e.g. FIG. 11*a*).

In some examples, the bass dipole loudspeaker may be mounted at or to a rear face of a rigid chassis of the bass waveguide. If the rear face of the rigid chassis provides the rear face of the headrest, then the bass dipole loudspeaker mounted to or at a rear face of the rigid chassis may be considered to be mounted substantially at the rear face of the headrest (see e.g. FIGS. 7*a*, 8*a*, 9*a*, 10*a*).

If the bass waveguide has one forward-facing opening (see e.g. FIG. 7*a*), the area of the forward-facing opening provided by the bass waveguide may be taken to be the area enclosed by projecting the contour of the forward-facing opening onto a plane perpendicular to the forwards direction.

If the bass waveguide has more than one forward-facing opening (see e.g. FIG. 9*a*), then the area of the forward-facing openings may be taken to be the sum of the areas enclosed by projecting the contour of each forward-facing opening onto a plane perpendicular to the forwards direction.

The bass waveguide may include at least one rearward-facing opening. The at least one rearward-facing opening of the bass waveguide may be configured to allow sound produced by the second radiating surface of the bass dipole loudspeaker to propagate out of the waveguide (see e.g. FIGS. 7*a*, 8*a*, 9*a*, 10*a*) or to allow sound produced by the first radiating surface of the bass dipole loudspeaker to propagate into the bass waveguide (see e.g. FIG. 11*a*).

In some examples, the bass waveguide may contain one or more regions of material which are configured to allow bass sound to propagate therethrough substantially uninhibited. Since such regions of material allow bass sound to propagate therethrough, their presence can be ignored for the purposes of determining the area of the at least one forward-facing opening. See e.g. FIG. 9*a*, where the foam material which fills the forward-facing openings (which is configured to allow bass sound to propagate therethrough substantially uninhibited) can be ignored when determining the area of the forward-facing openings provided by the bass waveguide.

In some examples, the at least one forward-facing opening may be covered by one or more regions of material which are configured to allow bass sound to propagate therethrough substantially uninhibited. Again, since such regions of material allow bass sound to propagate therethrough substantially uninhibited, their presence can be ignored for the purposes of determining the area of the at least one forward-facing opening. See e.g. FIGS. 7*a*, 8*a*, 10*a*, 11*a*, where the forward-facing opening is covered by a grille and a foam material which are configured to allow bass sound to propagate therethrough substantially uninhibited, and as such the grille and foam material can be ignored when determining the area(s) of the forward-facing opening(s) provided by the bass waveguides.

Herein, a grille may be viewed as being configured to allow bass sound to propagate therethrough substantially uninhibited if it is at least 20% open. Herein, a region of material having a specific airflow resistance of 50 Pa·s/m or less can be considered as a region of material which is configured to allow bass sound to propagate therethrough substantially uninhibited.

The headrest may include a rigid chassis, wherein the bass waveguide is formed at least in part by the rigid chassis.

The rigid chassis may include at least one forward-facing opening which faces in the forwards direction.

The rigid chassis may include one or more walls configured to guide bass sound produced by the first radiating surface towards the at least one forward-facing opening of the bass waveguide.

The one or more walls of the rigid chassis may include one or more solid walls.

The one or more walls of the rigid chassis may include one or more perforated walls, covered with a portion of non-rigid material configured to guide bass sound produced by the first radiating surface towards the at least one forward-facing opening of the bass waveguide (see below for possible properties of the portion of non-rigid material configured to guide bass sound produced by the first radiating surface towards the at least one forward-facing opening of the bass waveguide).

The one or more walls of the rigid chassis preferably include a region in which a width of the bass waveguide (e.g. in a direction perpendicular to the forwards direction) gradually widens in the forwards direction. This may help provide improved loudspeaker performance compared with a non-gradual widening.

The at least one forward-facing opening of the rigid chassis may be covered by a front grille (e.g. a front grille of the rigid chassis) that is configured to allow bass sound to propagate therethrough substantially uninhibited. The front grille may be covered by one or more regions of material which are configured to allow bass sound to propagate therethrough substantially uninhibited. The front grille may be covered by one or more regions of material configured to provide support to a user (e.g. support foam). The one or more regions of material configured to provide support to a user may be configured to inhibit the propagation of bass sound therethrough.

In some examples, the at least one forward-facing opening of the rigid chassis may serve as the at least one forward-facing opening of the bass waveguide (see e.g. FIGS. 7*a*, 8*a*, 10*a*, 11*a*).

The rigid chassis may include at least one rearward-facing opening which faces in the rearwards direction.

The rigid chassis may include one or more walls configured to guide bass sound produced by the second radiating surface towards the at least one rearward-facing opening of the rigid chassis. But such walls are optional, since if the bass dipole loudspeaker is mounted towards the rearward face of the headrest, the second radiating surface of the bass dipole loudspeaker may already be at or close to the at least one rearward-facing opening (see e.g. FIGS. 7*a*, 8*a*, 9*a*). Also, in some examples, the bass dipole loudspeaker may be mounted on a rearward side of a rear grille covering the rearward-facing opening (see e.g. FIG. 11*a*).

The at least one rearward-facing opening of the rigid chassis may be covered by a rear grille (e.g. a rear grille of the rigid chassis) that is configured to allow bass sound to propagate therethrough substantially uninhibited. The rear grille may be covered by one or more regions of material which are configured to allow bass sound to propagate therethrough substantially uninhibited. In some examples, the rear face of the rigid chassis may provide the rear face of the headrest (see e.g. FIGS. 7*a*, 8*a*, 10*a*, 11*a*). In other examples, the rear grille may be covered by one or more regions of material which are configured to inhibit the propagation of bass sound therethrough (not shown).

In some examples, the at least one rearward-facing opening of the rigid chassis may serve as the at least one rearward-facing opening of the bass waveguide (see e.g. FIGS. 7*a*, 8*a*, 10*a*, 11*a*).

The bass waveguide may include one or more portions of non-rigid material configured to guide bass sound produced by the first radiating surface towards the at least one forward-facing opening of the bass waveguide.

In order to guide bass sound, the one or more portions of non-rigid material should be configured to inhibit the propagation of bass sound therethrough. By way of example, the one or more portions of non-rigid material may include one or more portions of a material configured to provide support to a user, e.g. a open-cell support foam.

The one or more portions of non-rigid material may include one or more walls configured to guide bass sound produced by the first radiating surface towards the at least one forward-facing opening of the bass waveguide.

The one or more walls of non-rigid material may include a region in which the width of the bass waveguide gradually widens in the forwards direction.

The one or more portions of non-rigid material may be used in combination with a rigid chassis (see e.g. FIGS. 9*a*, 10*a*), or may be used instead of a rigid chassis (not shown).

The one or more portions of non-rigid material may provide the at least one forward-facing opening of the bass waveguide (see e.g. FIG. 9*a*).

The one or more portions of non-rigid material may be formed of a material (e.g. a foam material) having a specific airflow resistance that is higher than 50 Pa·s/m, more preferably 100 Pa·s/m or higher. With a specific airflow resistance that is higher than 50 Pa·s/m, more preferably 100 Pa·s/m or higher, the one or more portions of non-rigid material can be considered to be acoustically closed to bass frequencies.

The one or more portions of non-rigid material may (optionally in addition to previously described features concerning the specific airflow resistance of the one or more portions of non-rigid material) have a specific airflow resistance that is 500 Pa·s/m or lower, since this may allow the one or more walls to allow mid-high frequency sound to propagate therethrough substantially uninhibited.

But it is also possible for the one or more portions of non-rigid material to have a specific airflow resistance that is 500 Pa·s/m or higher, which may cause the one or more walls to be absorbent to mid-high frequency sound. This can help to dampen mid-high frequency resonances that may otherwise occur in the bass waveguide, if at least one mid-high frequency loudspeaker is mounted in the bass waveguide (see below).

The area of the at least one forward-facing opening of the bass waveguide may be at least 1.5 times larger than the area of the first radiating surface as projected onto a plane perpendicular to a movement axis of the bass dipole loudspeaker.

The area of the at least one forward-facing opening of the bass waveguide may be at least 2 times larger than the area of the first radiating surface as projected onto a plane perpendicular to a movement axis of the bass dipole loudspeaker.

The area of the at least one forward-facing opening of the bass waveguide may be at least 3 times larger than the area of the first radiating surface as projected onto a plane perpendicular to a movement axis of the bass dipole loudspeaker.

The area of the at least one forward-facing opening of the bass waveguide may be at least 4 times larger than the area of the first radiating surface as projected onto a plane perpendicular to a movement axis of the bass dipole loudspeaker.

This helps to further raise the SPL threshold at which "tactile fizzle" may be perceived.

The headrest may include one or more components of the loudspeaker assembly in a space between the first radiating surface of the diaphragm and the front face of the headrest. The one or more components of the loudspeaker assembly may include, for example, an electronic circuit board, an amplifier, a shaker, a motor (e.g. for headrest positioning, massaging function or ventilation), see e.g. FIG. 11*a*.

The drive unit of the bass dipole loudspeaker may be an electromagnetic drive unit that includes a magnet unit configured to produce a magnetic field in an air gap, and a voice coil attached to the diaphragm, wherein the voice coil is configured to sit in the air gap when the diaphragm is at rest. When the loudspeaker is in use, the voice coil may be energized (have an electric current passed through it) to produce a magnetic field which interacts with the magnetic field produced by the magnet unit and which causes the voice coil (and therefore the diaphragm) to move relative to the magnet unit along a movement axis. Such drive units are well known.

In some examples, a magnet unit of the drive unit of the bass dipole loudspeaker may be located rearwards of the second radiating surface, i.e. partially blocking sound produced by the second radiating surface. In this case, the bass dipole loudspeaker may be referred to as being "forward-facing" since the radiating surface of a dipole loudspeaker that does not have the magnet unit located in front of it (the first radiating surface, in this case) is typically thought of as the front face of the dipole loudspeaker. This arrangement may help to reduce motor operating noises.

In some examples, a magnet unit of the drive unit of the bass dipole loudspeaker may be located forwards of the first radiating surface, i.e. partially blocking sound produced by the first radiating surface. In this case, the bass dipole loudspeaker may be referred to as being "rearward-facing" since the radiating surface of a dipole loudspeaker that does not have the magnet unit located in front of it (the second radiating surface, in this case) is typically thought of as the front face of the dipole loudspeaker. This arrangement may help to reduce stray magnetic flux reaching the head of a user positioned in front of the front face of the headrest (e.g. if the magnet unit incorporates a U-yoke, or a T-yoke, where more flux may be present at an open side of the T-yoke or U-yoke).

The headrest may include a bass dipole loudspeaker frame from which the diaphragm of the bass dipole loudspeaker is suspended by one or more suspension elements. The rigid chassis (discussed above) may serve as the bass dipole loudspeaker frame, or the bass dipole loudspeaker frame may itself be suspended from the rigid chassis. A variety of possible suspension arrangements are disclosed in the previous applications discussed in the background section (above) and need not be discussed further herein.

The headrest may include one or more mid-high frequency loudspeakers.

Mid-high frequency loudspeakers may be understood herein as loudspeakers configured to produce sound in the mid-high frequency range, where the mid-high frequency range may include frequencies in the range 500 Hz-2 kHz, more preferably 300 Hz-3 kHz.

In some examples, the/each mid-high frequency loudspeaker may be located within the bass waveguide (see e.g. FIGS. 7*a*, 9*a*, 10*a*, 11*a*). This can help to save space within the headrest, and help to maximise the area of the forward-facing opening of the bass waveguide.

In some examples, the/each mid-high frequency loudspeaker may be located within a region of the bass waveguide provided by the rigid chassis (see e.g. FIGS. 7*a*, 9*a*, 10*a*, 11*a*). Again, this can help to save space within the headrest.

In other examples, the/each mid-high frequency loudspeaker may be located outside of the bass waveguide (see e.g. FIG. 8*a*).

In some examples, a first set of one or more mid-high frequency loudspeakers may be located within a region of the bass waveguide provided by the rigid chassis, and a second set of one or more mid-high frequency loudspeakers may be located outside of the bass waveguide.

In some examples, the/each mid-high frequency loudspeaker may be a loudspeaker as described in WO2021185777 or GB2112473.0, for example. In this case, the/each mid-high frequency loudspeaker is preferably mounted with space around a front face and rear face of the mid-high frequency loudspeaker, to allow interaction between the sound produced by the first and second radiating surfaces of the mid-high frequency loudspeaker (as taught in WO2021185777, for example).

In some examples where at least one mid-high frequency loudspeaker is mounted in the bass waveguide, a porous material may be mounted proximate to the/each mid-high frequency loudspeaker, for example, to provide absorption of mid-high frequency sound at suitable locations in the bass waveguide. This might be appropriate, for example, if one or more walls of the bass waveguide are reflective to mid-high frequency sound (but is less likely to be appropriate if the one or more walls of the bass waveguide are absorbent for mid-high frequency sound, as in e.g. FIG. 10*a*).

In some examples, the loudspeaker assembly may have two (or more) bass dipole loudspeakers.

If there are two (or more) bass dipole loudspeakers, then each bass dipole loudspeaker may have its own (separate) bass waveguide (see e.g. FIG. 10*a*).

If there are two (or more) bass dipole loudspeakers, with each bass dipole loudspeaker having its own (separate) bass waveguide, then any one or more features described above with respect to "the" bass dipole loudspeaker and "the" bass waveguide may apply to each bass dipole loudspeaker and/or each bass waveguide. For example, each bass waveguide may respectively provide at least one forward-facing opening, wherein for each bass waveguide, the area of the at least one forward-facing opening is larger than the area of the first radiating surface of the corresponding bass dipole loudspeaker as projected onto a plane perpendicular to a movement axis of the bass dipole loudspeaker.

If there are two (or more) bass dipole loudspeakers, then each bass dipole loudspeaker may share the same bass waveguide (see e.g. FIG. 7*a*). If the two or more bass dipole loudspeakers share the same bass waveguide, then previously described features concerning the area of the first radiating surface as projected onto a plane perpendicular to a movement axis of the bass dipole loudspeaker may instead be applied to the sum of the areas of each first radiating surface of a respective bass dipole loudspeaker as projected onto a respective plane perpendicular to a respective movement axis of that respective bass dipole loudspeaker.

In a second aspect, the present invention may provide a seat assembly that comprises:

- a seat for seating a user; and
- a loudspeaker assembly according to the first aspect, wherein the headrest of the loudspeaker assembly is used as a headrest of the seat.

The seat may be configured to position a user who is sat down in the seat such that the head of the user is located in front of the front face of the headrest, for example with the head of the user being located within 30 cm, more preferably within 20 cm, from the front face of the headrest.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

The following examples seek to provide a loudspeaker assembly including a headrest which is able to provide a personal sound "cocoon" in which a listener in close proximity of the headrest is able to experience full range audio, whilst such sound is significantly suppressed for listeners further away from the headrest. Compared to the known examples discussed in the background section (above), the bass element of this sound can be enhanced, because a higher SPL at bass frequencies can be achieved with reduced "tactile fizzle".

Figure 1:
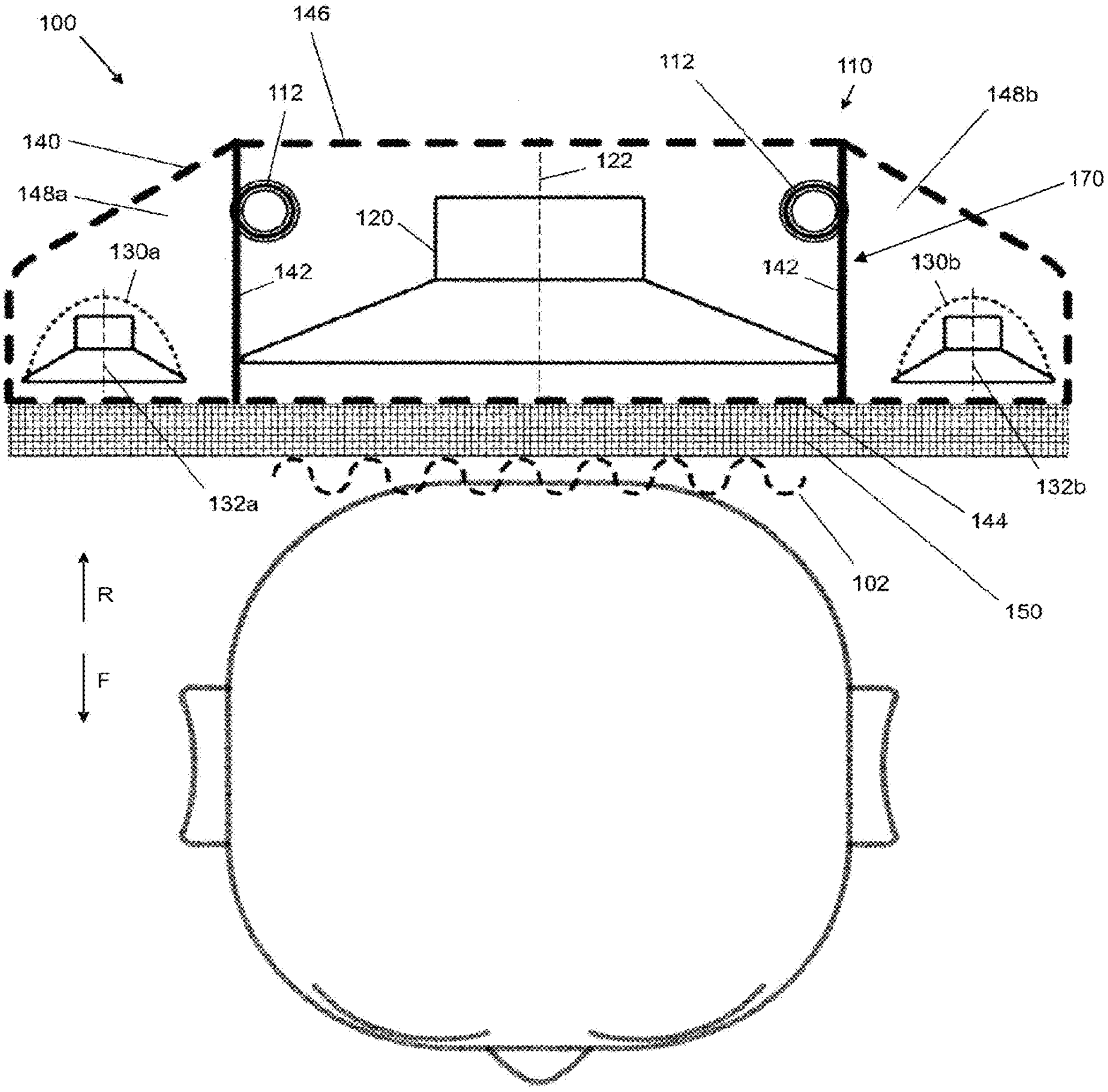
FIG. 1 shows a test loudspeaker assembly designed by the present inventor in accordance with principles taken from known examples.

FIG. 1 shows a loudspeaker assembly 100 designed by the present inventor in accordance with principles taken from the known examples discussed in the background section.

In the loudspeaker assembly 100 of FIG. 1, there is a headrest 110 having one bass dipole loudspeaker 120 and two mid-high frequency loudspeakers 130*a*, 130*b* mounted thereto.

The headrest 110 includes two mounting pins 112 for mounting the headrest 110 to a seat (not shown), as is standard for most car seats.

In this example, the headrest 110 includes a rigid chassis 140, which is attached to the mounting pins 112.

The rigid chassis 140 includes solid walls 142, a forward-facing opening at the front of the headrest 110 covered by a front grille 144, and a rearward-facing opening at the rear of the headrest 110 covered by a rear grille 146.

The solid walls 142 are configured to guide bass sound produced by a first radiating surface of the bass dipole loudspeaker 120 to the forward-facing opening of the rigid chassis 140 and to guide bass sound produced by a second radiating surface of the bass dipole loudspeaker 120 to the rearward-facing opening of the rigid chassis 140.

The forwards direction F and the rearwards direction R are both indicated on FIG. 1, along with a movement axis 122 of the bass dipole loudspeaker 120 and movement axes 132*a*, 132*b* of the mid-high frequency loudspeakers 130*a*, 130*b*.

In this example, a bass waveguide 170 is formed by the one or more solid walls 142 of the rigid chassis 140, with the forward-facing opening of the rigid chassis 140 serving as a forward-facing opening of the bass waveguide 170, and with the rearward-facing opening of the rigid chassis 140 serving as a rearward-facing opening of the bass waveguide 170. Thus, the one or more solid walls 142 of the rigid chassis 140 are configured to guide bass sound produced by a first radiating surface of the bass dipole loudspeaker 120 out from the front face of the headrest 110 via the forward-facing opening of the bass waveguide 170.

In this example, the one or more solid walls 142 of the rigid chassis 140 are also configured to guide bass sound produced by a second radiating surface of the bass dipole loudspeaker 120 out from the rear face of the headrest 110 via the rearward-facing opening of the bass waveguide 170.

In this example, the one or more solid walls 142 of the rigid chassis 140 are also configured to guide bass sound produced by a second radiating surface of the bass dipole loudspeaker 120 out from the rear face of the headrest 110 via the rearward-facing opening of the bass waveguide.

As such, the bass dipole loudspeaker 120 is mounted to the headrest 110 in a position that is forwards of the mounting pins 112, such that the mounting pins 112 are located between the bass dipole loudspeaker 120 and the rear face of the headrest 110.

The rigid chassis 140 also includes two acoustically open (by being perforated) wing portions 148*a*, 148*b*, with each mid-high frequency loudspeaker 130*a*, 130*b* being mounted in a respective wing portion 148*a*, 148*b*.

The forward-facing opening of the rigid chassis 140 is covered by a layer of foam material 150 (e.g. an open-cell foam having a specific airflow resistance of 50 Pa·s/m or lower) which is configured to allow bass sound to propagate therethrough substantially uninhibited.

The mid-high frequency loudspeakers 132*a*, 132*b* are highly directive, in view of the frequency band in which they operate, and their directivity may be further improved by following the teaching in WO2021/185777 for example.

The bass dipole loudspeaker 120 is not highly directive but, following the teaching of WO2019/121266, provides good SPL to a user in close proximity (e.g. sat in a seat incorporating the headrest) and suppressed SPL for anyone located further away.

When testing the loudspeaker assembly 100 depicted in FIG. 1, the inventor detected what is referred to herein as "tactile fizzle" when their head was positioned in front of the headrest 110 (in a position that might reasonably be expected to be occupied by a head of a user sat in a seat incorporating the headrest 110). The phenomenon of "tactile fizzle" has already been explained above, and "tactile fizzle" is represented by the pictogram 102 in FIG. 1.

In particular, when the loudspeaker assembly 100 was used to reproduce bass frequencies at relatively loud levels (above 95 dB measured at 10 cm in front of the headrest), the present inventor detected a "tactile fizzle" at the back of their head and neck. The present inventor observed that this could be perceived as annoying by users, and could jeopardize the listening experience at higher SPL levels.

Without wishing to be bound by theory, the present inventor believes that particle velocity exceeding a certain threshold is the cause of this "tactile fizzle".

Experimental measurements were performed on a test loudspeaker assembly 100 according to FIG. 1 in which the bass dipole loudspeaker 120 had an effective radiating surface area of 125 $cm^2$. Further details of the bass dipole loudspeaker 120 used are shown in Table 1.

TABLE 1

| Sd [$cm^2$] | Fs [Hz] | Mms [g] | Qms | Re [Ω] | BL [Tm] | Le [mH] | Urms [V] |
|---|---|---|---|---|---|---|---|
| 125.00 | 40.00 | 11.28 | 6.76 | 2.89 | 2.14 | 0.20 | 4.00 |

The parameters referenced in Table 1 were as follows

Sd=effective radiating surface area of the first and second radiating surfaces of the bass dipole loudspeaker [$cm^2$]

Fs=resonance frequency of the bass dipole loudspeaker's mobile system [Hz]

Mms=moving mass including air load of the bass dipole loudspeaker's mobile system [g]

Qms=mechanical quality factor of the bass dipole loudspeaker's mobile system [dimensionless]

Re=electrical resistance of the voice coil [ohm]

BL=product of magnet field strength and wire length indicating motor strength [Tm]

Le=inductance of motor [mH]

Urms=applied (RMS) voltage to bass unit [V]

Figure 2A:
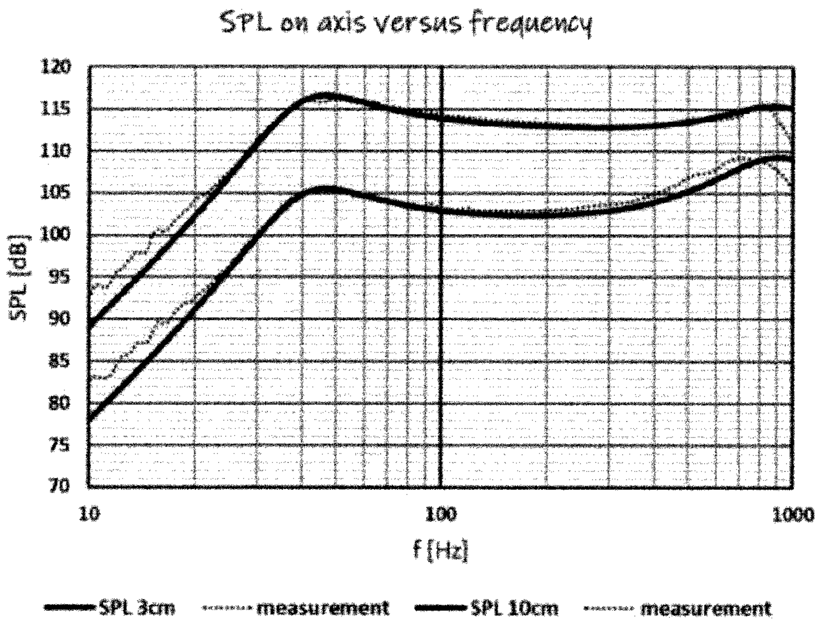
FIGS. 2*a-b* show results (actual and calculated) obtained for the bass dipole loudspeaker of FIG. 1.

FIG. 2*a* shows the frequency response obtained using the test loudspeaker assembly 100 with the bass dipole loudspeaker 120 having the above parameters.

In FIG. 2*a:*

The upper dotted line was measured at 3 cm in front of the headrest 110, with the upper solid line being the calculated response at this distance.

The lower dotted line was measured at 10 cm in front of the headrest 110 with the lower solid line being the calculated response at this distance.

The calculated response was calculated using a simulation. That there are only minor variations between the dotted curves and the solid lines in FIG. 2*a* show that the measurements are roughly in line with the theoretical calculation.

Figure 2B:
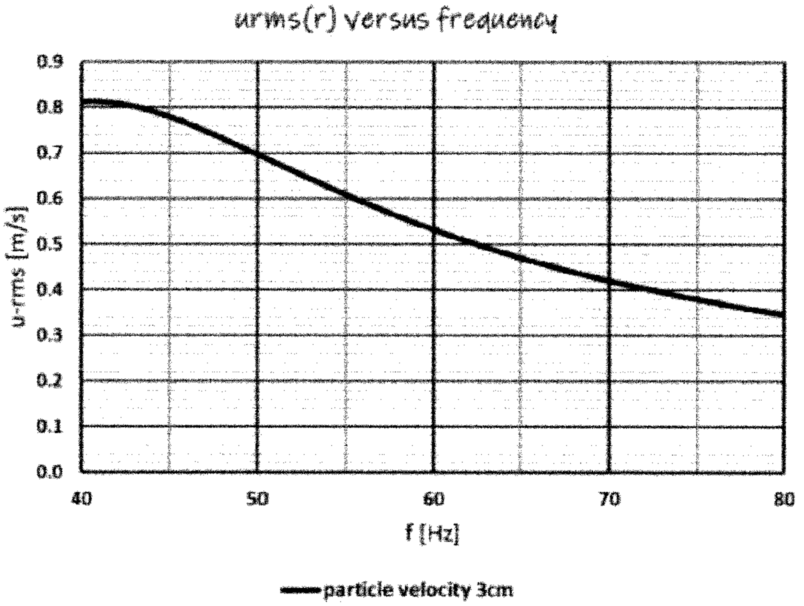

FIG. 2*b* shows the calculated particle velocity at 3 cm from the headrest 110. The same simulation producing the upper SPL curve shown in FIG. 2*a* was used to calculate the results shown in FIG. 2*b*.

As shown by FIG. 2*b*, the bass dipole loudspeaker 120 produces higher particle velocities (Urms=root mean squared velocity in m/s) at lower frequencies. Without wishing to be bound by theory, it is believed this is because the bass dipole loudspeaker 120 needs to move more air at lower frequencies to produce the same SPL (according to known physical principles).

Figure 3A:
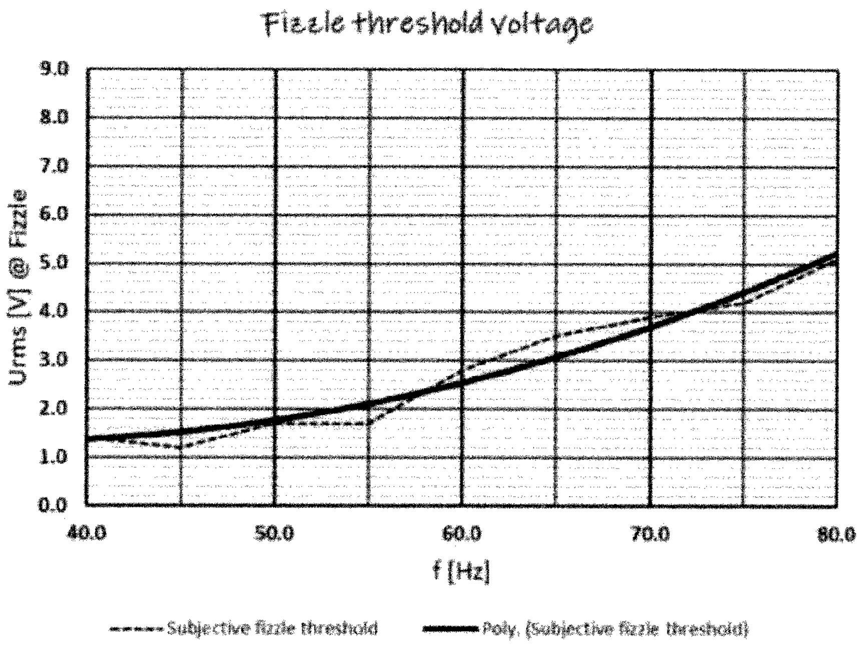
FIGS. 3*a-b* show the results of experimental work performed using the bass dipole loudspeaker of FIG. 1.

FIG. 3*a* shows the result of an experiment in which bass frequencies between 40 Hz and 80 Hz were generated with incremental voltage levels until a noticeable "tactile fizzle" could be detected on the back of the head/neck by the present inventor.

To produce the results shown in FIG. 3*a*, the present inventor's head was located at a distance of 1 cm to 3 cm approximately from the front face of the headrest 110 of the loudspeaker assembly 100 shown in FIG. 1.

Once the "tactile fizzle" was detected, the corresponding voltage supply level was noted, with these empirical values being indicated by the dotted line in FIG. 3*a*.

The solid line shown in FIG. 3*a* is a second order polynomial that fits the empirical values.

Figure 3B:
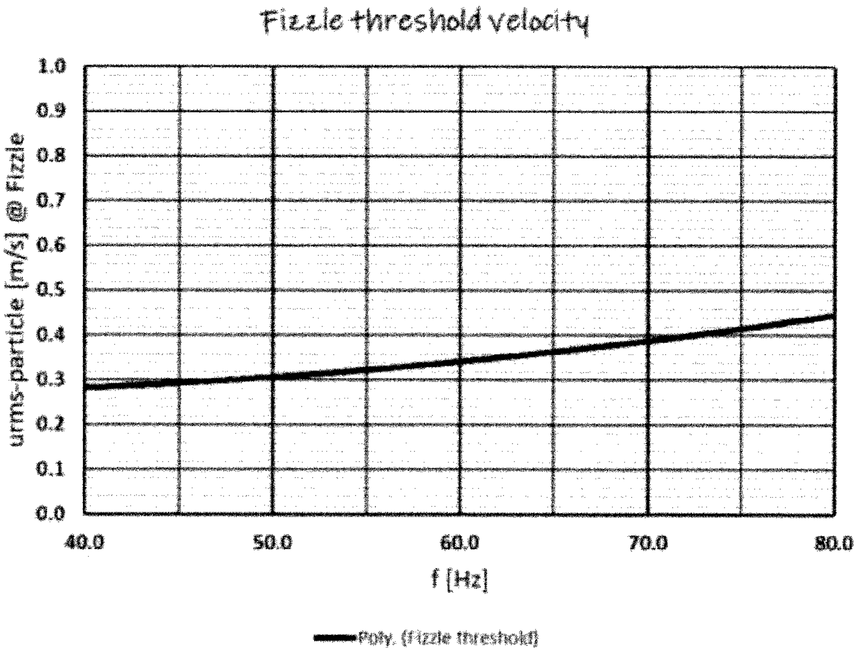

From the polynomial voltage levels indicated by the solid line shown in FIG. 3*a*, the particle velocity was calculated shown in FIG. 3*b*.

From FIGS. 3*a* and 3*b*, one may conclude that particle velocity levels in proximity of the back of the head or neck from ~0.3 m/s onwards may empirically be detected by a user as "tactile fizzle", albeit this has been determined with an element of subjectivity, given that different users may perceive "tactile fizzle" at different thresholds.

However, regardless of an individual's personal threshold for detecting "tactile fizzle", the present inventor found that reproducing music using the loudspeaker assembly 100 of FIG. 1 with bass levels exceeding 95 dB (measured at 10 cm from the front of the headrest) led to multiple users complaining about "tactile fizzle", indicating that regardless of possible threshold differences amongst users, practically all of them were noticing "tactile fizzle" at some point during louder listening.

Figure 4:
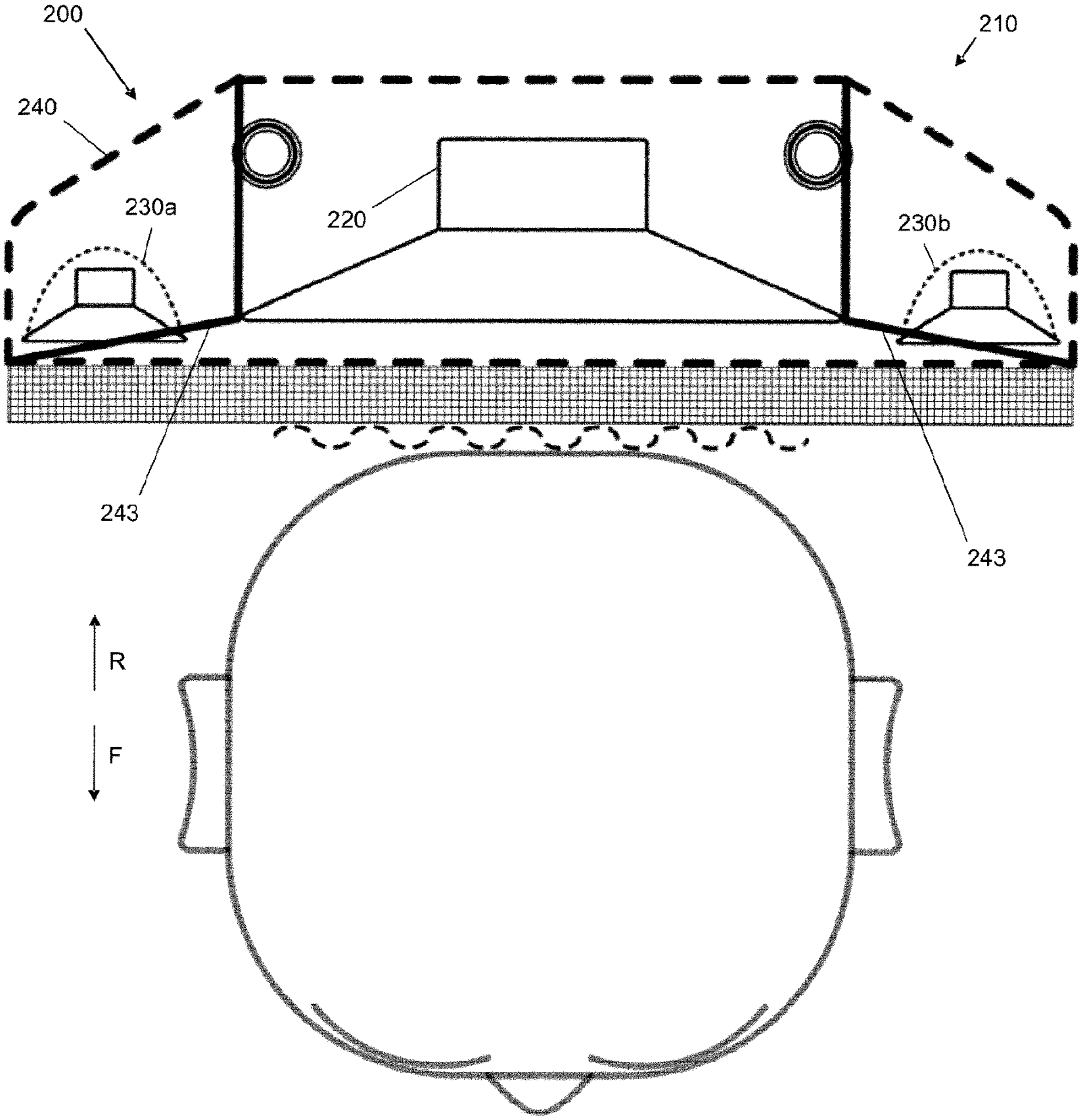
FIG. 4 shows a loudspeaker assembly which implements a first attempt by the present inventor to reduce the impact of "tactile fizzle".

FIG. 4 shows a loudspeaker assembly 200 which implements a first attempt by the present inventor to reduce the impact of "tactile fizzle" (e.g. by raising the SPL threshold before "tactile fizzle" is first perceived).

In this example, the front of the rigid chassis 240 includes a flared portion 243 which flares outwards, such that the area of the forward-facing opening of the bass waveguide is greater than in the example shown in FIG. 1.

The incorporation of the flared portion 243 in the loudspeaker assembly 200 of FIG. 4 was found to increase the SPL threshold at which "tactile fizzle" was first perceived by a listener a little bit, but not by a large amount, compared with the loudspeaker assembly 100 of FIG. 1. Without wishing to be bound by theory, the present inventor believes this is because the back of the user's head is still in close proximity to the diaphragm of the bass dipole loudspeaker 220. Additionally, cut-outs had to be made in the flared portions 243 to accommodate the mid-high frequency loudspeakers 230*a*, 230*b* and to allow sound produced by the first and second radiating surfaces of each mid-high frequency loudspeaker 230*a*, 230*b* to interact (which may be useful if the mid-high frequency loudspeakers are as disclosed in WO2021/185777).

Finite element method (FEM) simulations were performed to confirm these predictions.

Figure 5A:
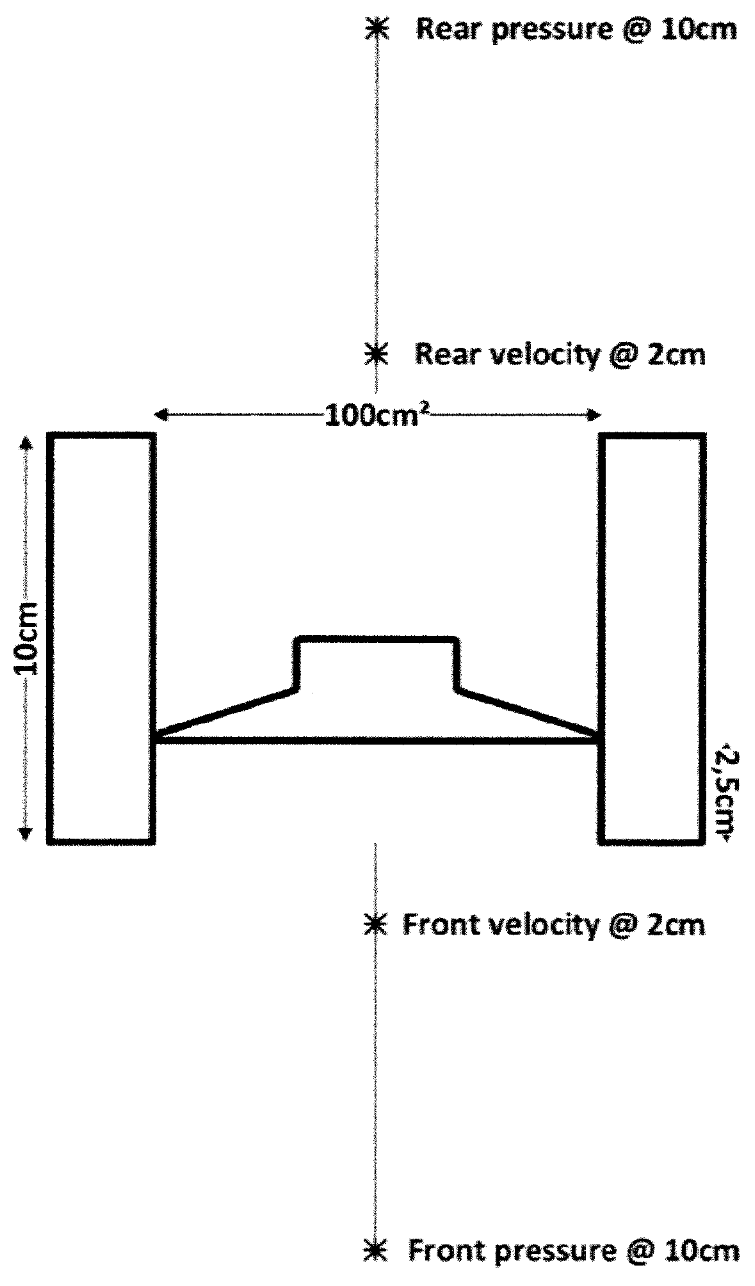
FIGS. 5*a-b* show a variety of loudspeaker assembly configurations used in finite element method (FEM) simulations performed by the inventor.

FIG. 5*a* shows a first loudspeaker assembly configuration used in the FEM simulations, referred to herein as "Config. #1".

Figure 5B:
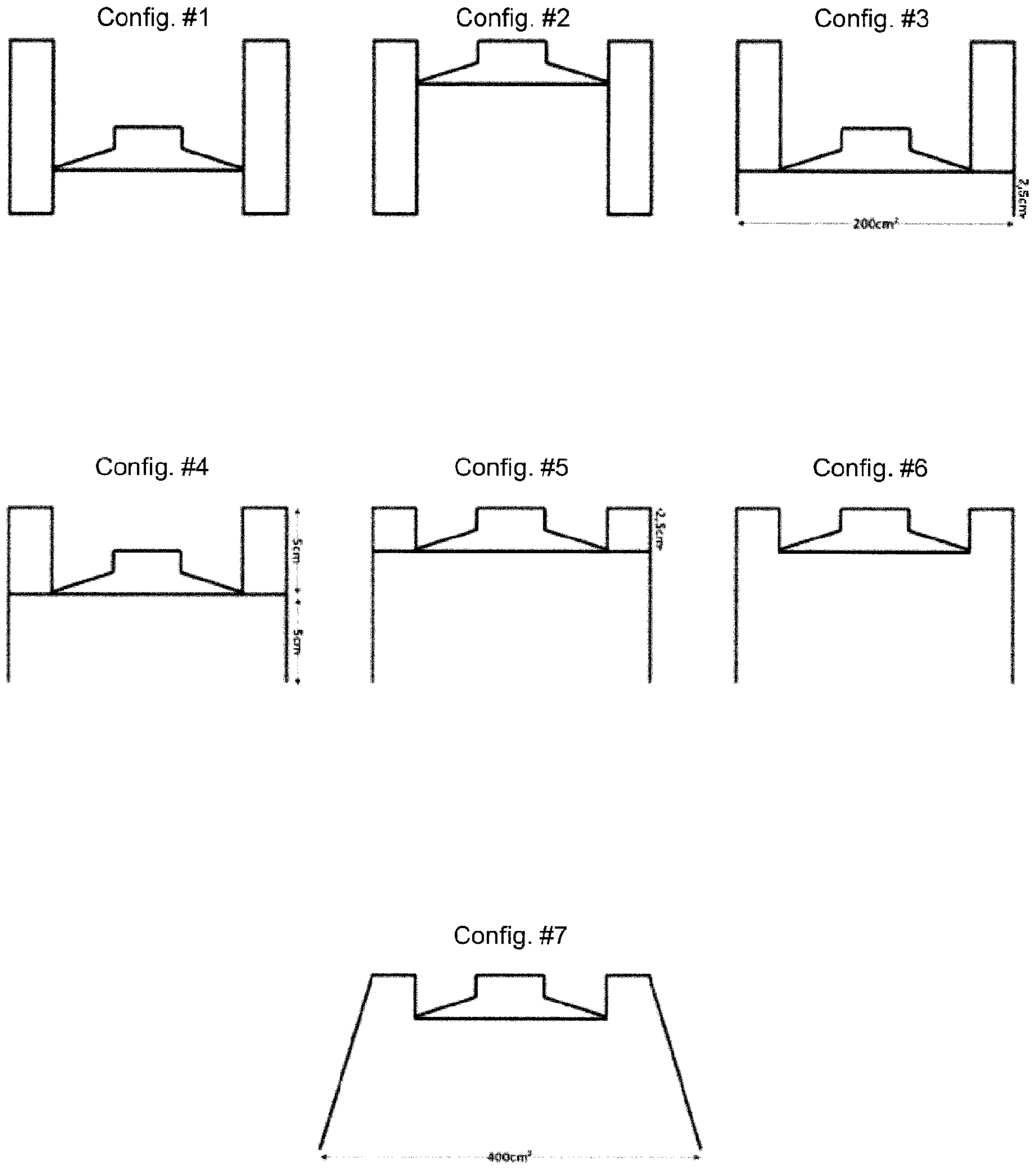

FIG. 5*b* shows first-seventh loudspeaker assembly configurations used in the FEM simulations, referred to herein as "Config. #1"-"Config. #7".

FIG. 5*a* illustrates dimensions for the simulated bass waveguide of Config. #1, as well as locations at which results were obtained using the simulations, with particle velocity evaluated at 2 cm from the forward-facing and rearward-facing openings while sound pressure was evaluated at 10 cm from the forward-facing and rearward-facing openings.

As depicted in FIG. 5*b:*

Config. #1 is as illustrated in FIG. 5*a*, with the bass dipole loudspeaker diaphragm at 2.5 cm from the forward-facing opening.

Config. #2 has the bass dipole loudspeaker diaphragm at 2.5 cm from the rearward-facing opening.

Config. #3 is like Config. #1 except the bass waveguide is modified such that the forward-facing opening has an area of 200 $cm^2$.

Config. #4 is like Config. #3, except the gap between the diaphragm and the forward-facing opening is 5 cm.

Config. #5 is like Config. #4, except the gap between the diaphragm and the forward-facing opening is 7.5 cm.

Config. #6 is like Config. #5, but the baffle parallel to the bass dipole loudspeaker is removed so that sound can enter the cavity next to the bass dipole loudspeaker.

Config. #7 is like Config. #6, but the walls of the bass waveguide are flared to further increase the area of the forward-facing opening to 400 $cm^2$.

For the simulations, a bass dipole loudspeaker having a diaphragm with first and second radiating surface areas of 100 $cm^2$, with constant acceleration, was assumed.

Figure 6A:
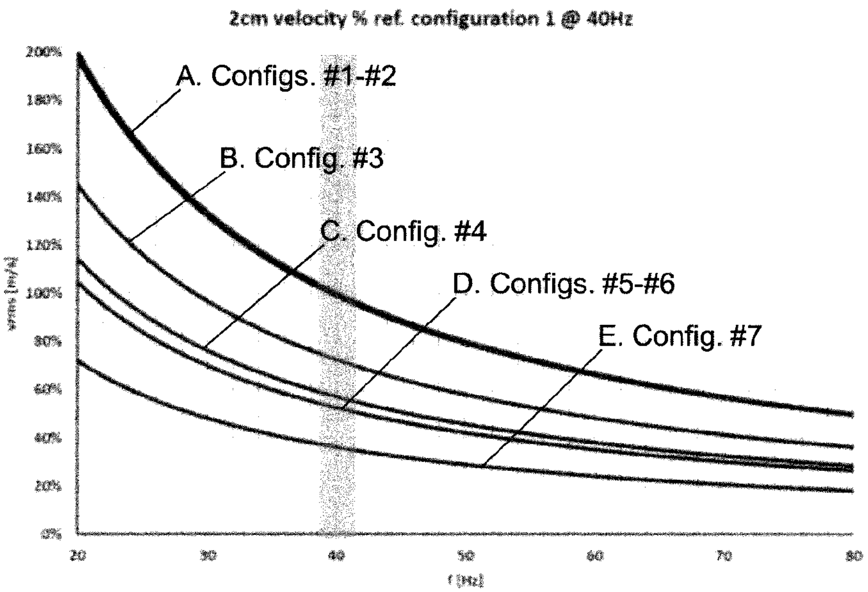
FIGS. 6*a-b* show the results of the FEM simulations performed using the loudspeaker assembly configurations shown in FIGS. 5*a-b*.

FIG. 6*a* shows the simulated particle velocity at 2 cm from the forward-facing opening for each of Configs. #1-#7.

The thick line is the simulated particle velocity at 2 cm from the forward-facing opening for Configs. #1-#2, which is the same since the length of the tube made no difference to the simulated particle velocity for a tube of constant cross section.

We note for completeness that the thick curve also shows the simulated particle velocity at 2 cm from the rearward-facing opening for all configurations (Configs. #1-#7), since the rearward-facing openings are identical (and tube length makes no difference to the simulated particle velocity for a tube of constant cross section).

The y-axis scale in FIG. 6*a* is expressed as a % of the simulated particle velocity at 2 cm from the forward-facing opening for Config. #1 at 40 Hz, to make it easier to quantify the relative benefits/disadvantages of the different configurations relative to Config. #1.

From FIG. 6*a*, we may conclude that increasing the forward-facing opening area together with increased distance from the bass dipole loudspeaker helps to decrease the particle velocity in proximity of the forward-facing opening.

Figure 6B:
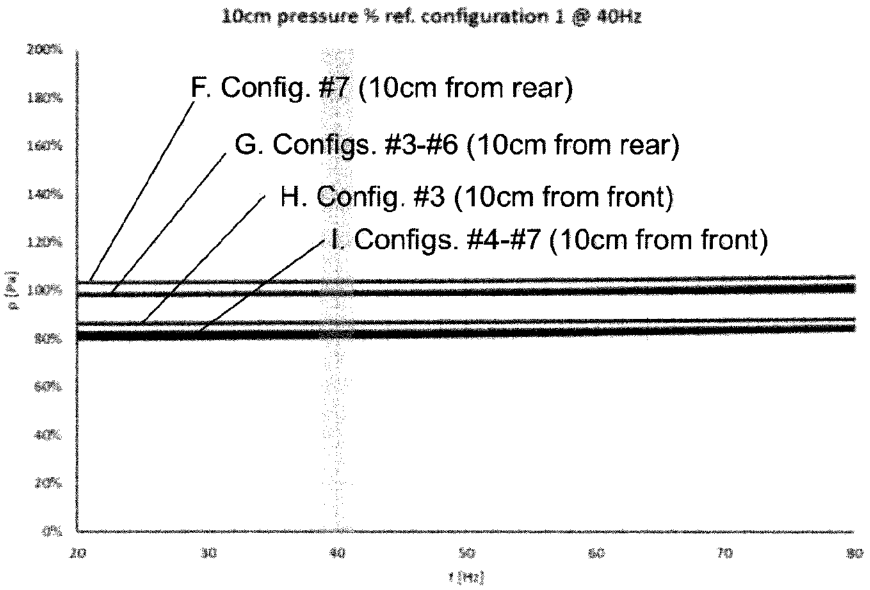

FIG. 6*b* shows the simulated sound pressure at 10 cm from the rearward-facing opening ("rear") and at 10 cm from the forward-facing opening ("front") for each of Configs. #3-#7.

Note that here it is sound pressure that is shown (in % of units of Pa with reference to the sound pressure of config. 1 at 40 Hz on a linear scale) rather than SPL (which has units of dB on a logarithmic scale). Curve G gives the variation of simulated sound pressure with frequency for Configs. #1-#2 (front and rear) as well as Configs. #3-#6 (all rear). The y-axis scale in FIG. 6*b* is expressed as a % of the simulated sound pressure at 10 cm from the forward-facing opening for Config. #1 at 40 Hz, to make it easier to quantify the relative benefits/disadvantages of the different configurations relative to Config. #1. From the data shown in FIGS. 6*a-b*, a "tactile fizzle metric" can be calculated for each of Configs. #3-#7 as:

"tactile fizzle metric"=[% sound pressure relative to Config. 1]/[% velocity relative to Config. 1]

In this formula, the "% sound pressure relative to Config. 1" for a given configuration is the sound pressure (front) of the configuration, expressed as a % relative to the sound pressure (front) for Config. #1 at 40 Hz (Curve G in FIG. 6*b* at 40 Hz, labelled on the y-axis as 100%), and the "% velocity relative to Config. 1" is the particle velocity (front) of the configuration, expressed as a % relative to the particle velocity (front) for Config. #1 at 40 Hz (Curve A in FIG. 6*a* at 40 Hz, labelled on the y-axis as 100%).

The "tactile fizzle metric" can be understood as representing the % sound pressure relative to Config. 1 that can be produced by the current loudspeaker assembly configuration before the listener will notice "tactile fizzle".

For Config. #3, velocity is ~73% and sound pressure is ~87%, giving a tactile fizzle metric of ~120% which is a ~20% improvement over Config. 1.

For Config. #4, it can be seen that moving the bass dipole loudspeaker further backwards while keeping the increased front-facing opening area leads to a velocity of ~57% and sound pressure of ~83%, giving a tactile fizzle metric of ~145% which is a modest ~45% improvement over Config. 1.

For Configs. #5-#6, the velocity is ~52% and sound pressure is ~82%, giving a tactile fizzle metric of ~158% which is a ~58% improvement over Config. 1.

For Config. #7, the velocity is ~36% and sound pressure is ~81%, giving a tactile fizzle metric of ~225% which is a significant ~125% improvement over Config 1.

Accordingly, FIGS. 6*a*-*b* illustrate that the most significant improvements can be provided by increasing the area of the front-facing opening of the bass waveguide in combination with moving the diaphragm further back in the bass waveguide.

In the examples that follow, alike features have been given alike reference numerals, and so previous descriptions of such features may apply where appropriate.

Where areas (e.g. Sd, So) have been indicated on cross-sectional figures (e.g. 7*a*, 8*a*), the labels have had the word "area" prepended to emphasise that these labels are indicating areas and not lengths.

Figure 7A:
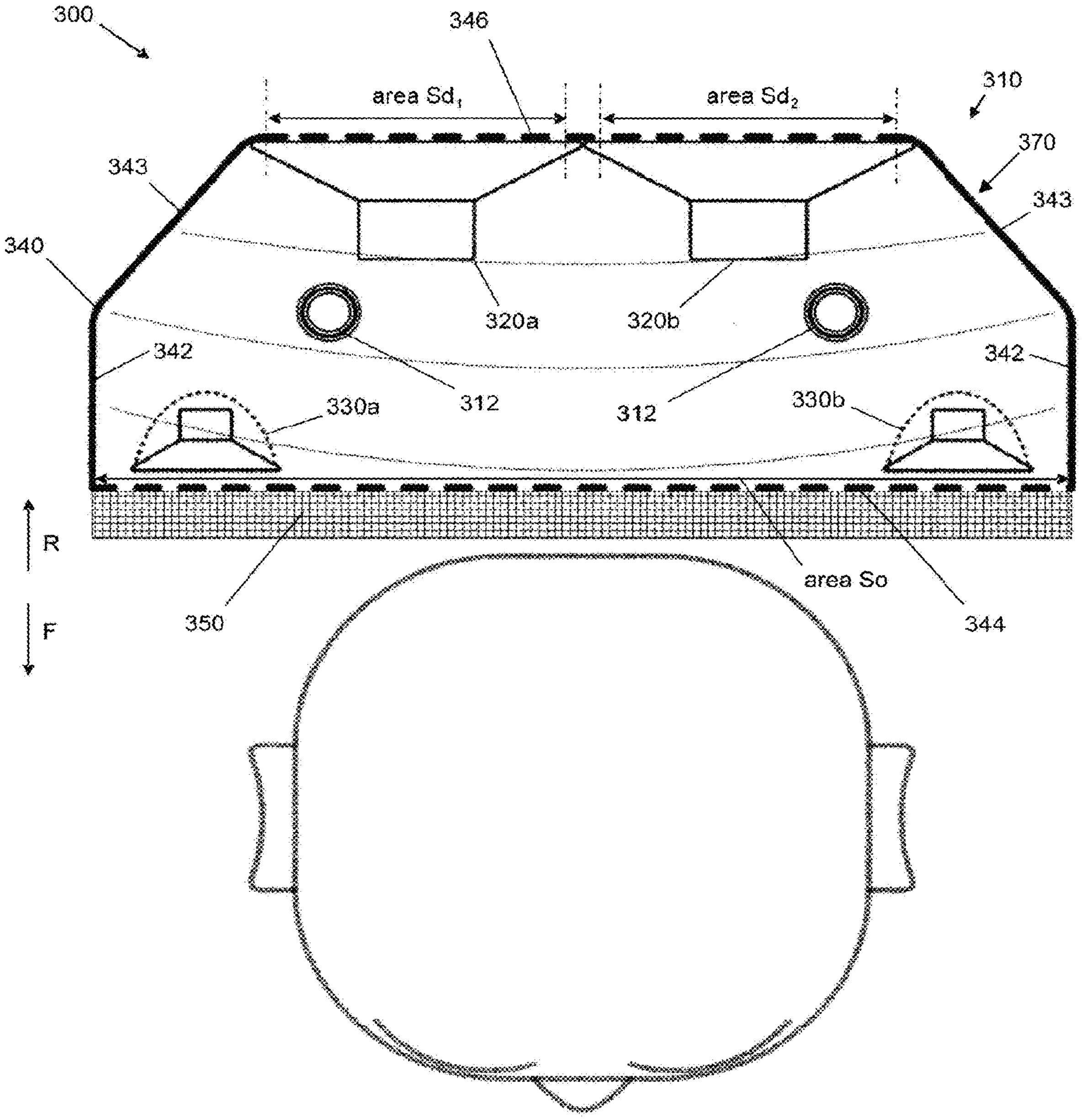
FIGS. 7*a-b* show a first loudspeaker assembly according to the present invention.
Figure 7B:
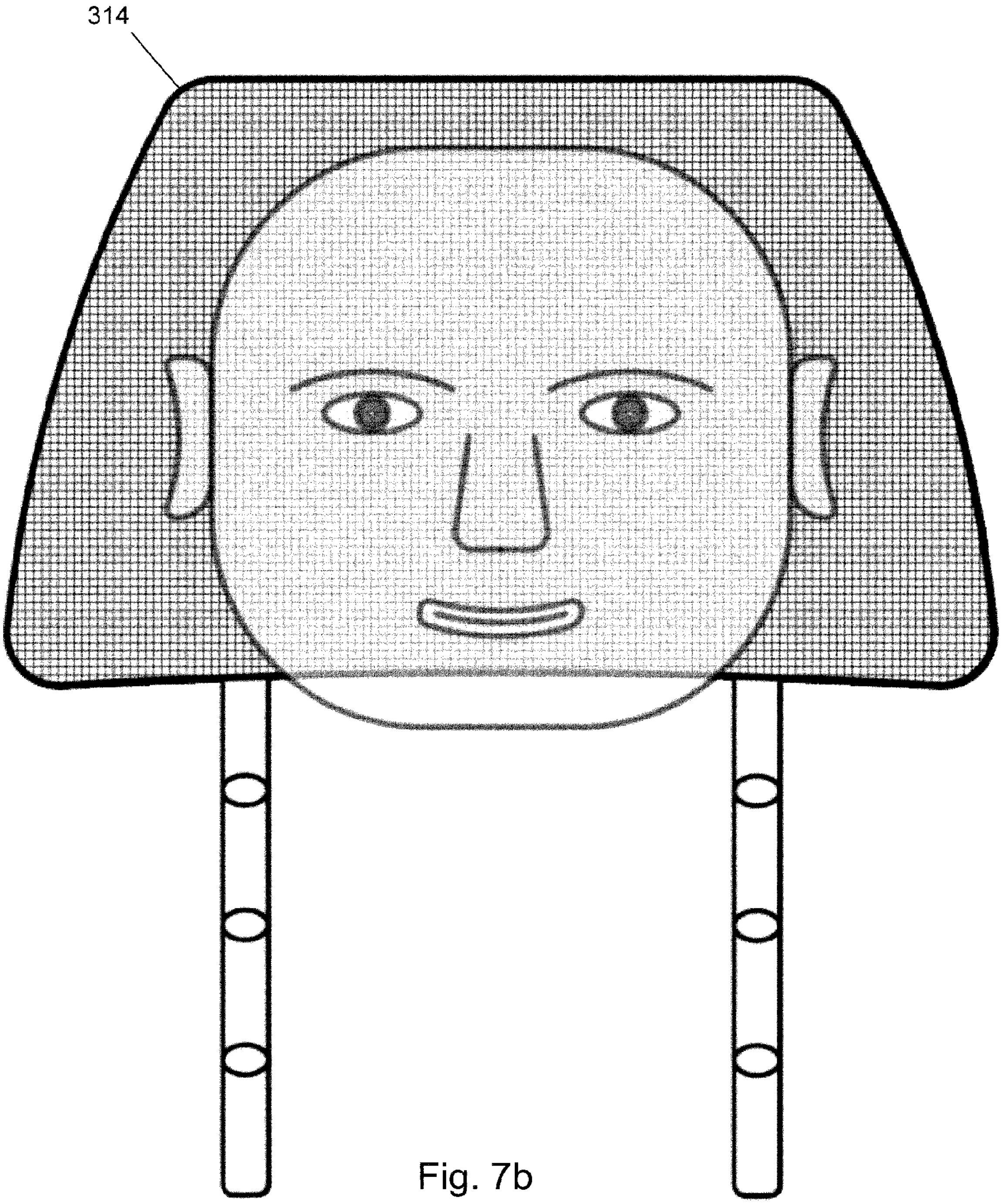

FIGS. 7*a*-*b* show a first loudspeaker assembly 300 according to the present invention.

Here, FIG. 7*a* shows the first loudspeaker assembly 300 in cross-section, and FIG. 7*b* shows the front face 314 of a headrest 310 of the first loudspeaker assembly 300.

In this example, the headrest 310 includes a rigid chassis 340, wherein the bass waveguide 370 is formed by one or more solid walls 342 of the rigid chassis 340.

The rigid chassis 340 includes a forward-facing opening which faces in the forwards direction. The forward-facing opening is covered by a front grille 344 of the rigid chassis 340, which is at least 20% open, and therefore is configured to allow bass sound to propagate therethrough substantially uninhibited. The front grille 344 is in turn covered by a region of foam material 350, which has a specific airflow resistance of more than 50 Pa·s/m, and therefore is configured to allow bass sound to propagate therethrough substantially uninhibited.

The region of foam material 350 may be an open-cell foam material such as reticulated polyurethane foam. Its purpose here is to give the headrest 310 the appearance of a more conventional car headrest. The region of foam material 350 may also bring additional support benefits for a user and may be covered with a finishing textile such as leather to improve the visual appearance of the headrest. This finishing textile is preferably configured to allow bass sound to propagate therethrough substantially uninhibited, e.g. by having a specific airflow resistance below 50 Pa·s/m, more preferably below 25 Pa·s/m (e.g. if leather is used it may have perforations such that it achieves an open surface area of at least 20% which is one way to obtain a desired specific airflow resistance).

The rigid chassis 340 includes a rearward-facing opening which faces in the rearwards direction. The rearward-facing opening is covered by a rear grille 346 of the rigid chassis 340, which is at least 20% open, and therefore is configured to allow bass sound to propagate therethrough substantially uninhibited. The rear grille 346 provides a rear face of the headrest 310.

In this example, the headrest 310 includes two bass dipole loudspeakers 320*a*, 320*b*, both of which are mounted at or to the rear grille 346, and therefore are mounted at the rear face of the headrest 310.

Thus, the bass dipole loudspeakers 320*a*, 320*b* are mounted to the headrest 310 in a position that is rearwards of the mounting pins 312, such that the one or more mounting pins 312 are located between the bass dipole loudspeakers 320*a*, 320*b* and the front face 314 of the headrest 310. Having the bass dipole loudspeakers 320*a*, 320*b* placed behind the mounting pins 312 has the advantage that larger bass dipole loudspeakers 320*a*, 320*b* can be fitted inside the headrest 310, preferably having first radiating surface areas which have a combined area of at least 100 $cm^2$. This also contributes to the safety of the headrest assembly 300 since in a crash event the bass dipole loudspeakers 320*a*, 320*b* are not only further away from the head of a passenger, but also situated behind the mounting pins 312 which will prevent or at least inhibit the bass dipole loudspeakers 320*a*, 320*b* from reaching a head of a user situated in front of the front face 314 of the headrest 310.

In this example, the bass dipole loudspeakers 320*a*, 320*b* are rearward-facing, i.e. with the magnet unit of the drive unit of the bass dipole loudspeaker located forwards of the first radiating surface. This can help to reduce stray magnetic fields reaching the head of a user positioned in front of the front face 314 of the headrest 310 (if the magnet unit incorporates a U-yoke or a T-yoke, where more flux may be present at an open side of the T-yoke or U-yoke).

The one or more solid walls 342 include a portion 343 in which the width of the bass waveguide gradually widens in the forwards direction.

The one or more solid walls 342 of the rigid chassis 340 (which form the bass waveguide in this example) are configured to guide sound produced by a first radiating surface of each of the bass dipole loudspeakers 320*a*, 320*b* to the forward-facing opening of the rigid chassis 340, which serves as the forward-facing opening of the bass waveguide.

In this example, the headrest 310 includes one or more mid-high frequency loudspeakers 330*a*, 330*b*, which are located within a region of the bass waveguide provided by the rigid chassis 340. These mid-high frequency loudspeakers 330*a*, 330*b* will not impede low frequencies, and by incorporating them within the bass waveguide, the size of the forward-facing opening of the bass waveguide can be maximised (thereby helping to maximise the SPL threshold when "tactile fizzle" sets in).

As shown by FIG. 7*b*, the area of the forward-facing opening of the rigid chassis 340, which serves as the forward-facing opening of the bass waveguide, occupies the whole front face 314 of the headrest 310.

The area So of the forward-facing opening, which equates to the area enclosed by projecting the contour of the forward-facing opening onto a plane perpendicular to the forwards direction F, is 400 $cm^2$. In contrast, the surface area Sd of the first radiating surface of each of the bass dipole loudspeakers 320*a*, 320*b* is 75 $cm^2$.

Accordingly, the area of the forward-facing opening So is 2.7 times larger than the sum of the areas of the first radiating surfaces of the bass dipole loudspeakers 320*a*, 320*b* (2Sd) which, combined with placing the bass dipole loudspeakers 320*a*, 320*b* towards the rear of the headrest 310, helps to reduce particle velocities when the bass dipole loudspeakers 320*a*, 320*b* operate at higher SPL levels, thereby helping to maximise the SPL threshold when "tactile fizzle" sets in.

Thus, with the construction of the first example loudspeaker assembly 300 of FIGS. 7*a-b*, an outer shell of the headrest 310 can act as the waveguide for low frequencies and since the largest area of the headrest 310 will typically be the front of the headrest 310 for obvious reasons, one can utilise this whole area as exit for bass frequencies thus helping to maximise the SPL threshold when "tactile fizzle" sets in.

Figure 8A:
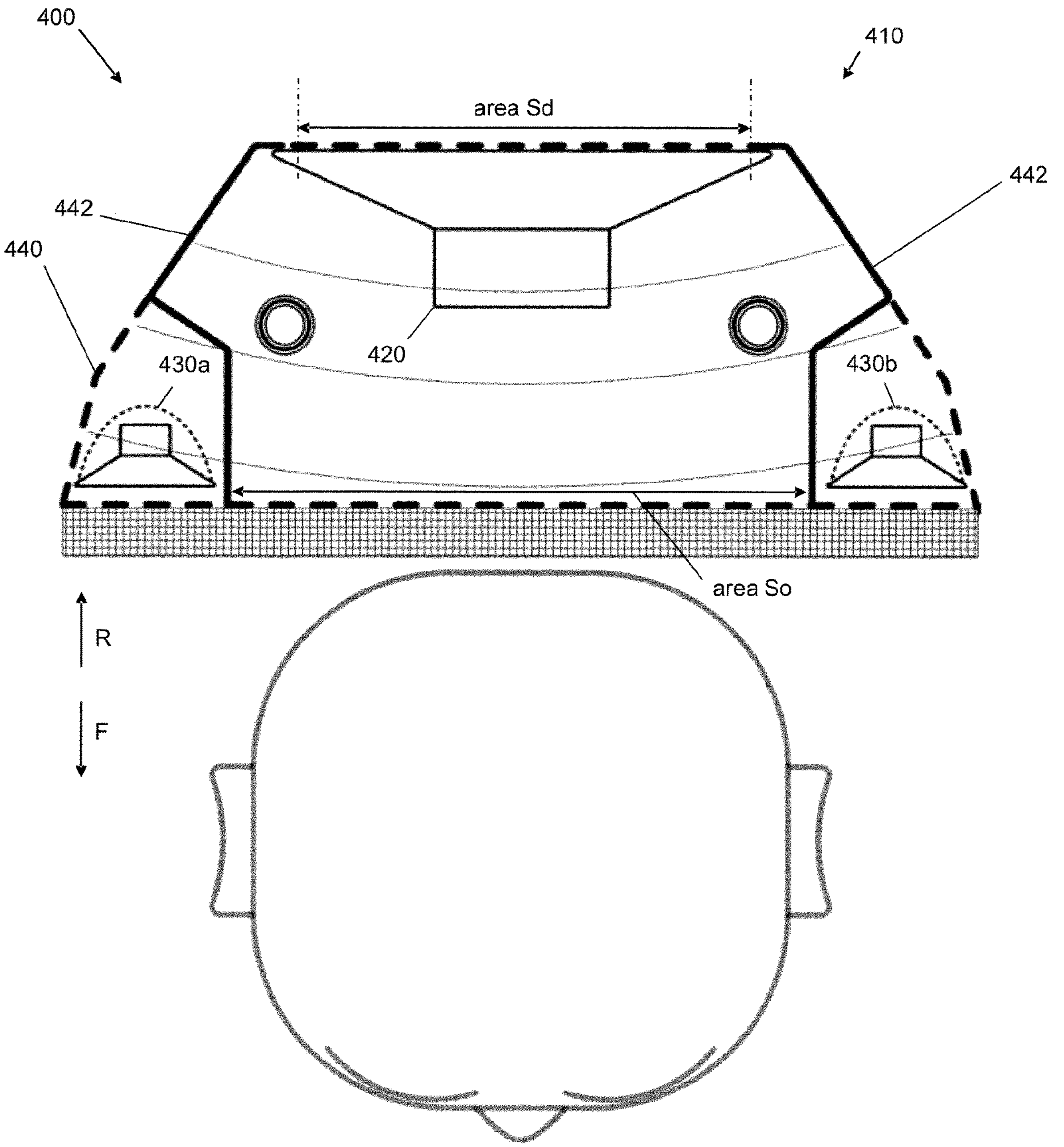
FIGS. 8*a-b* show a second loudspeaker assembly according to the present invention.
Figure 8B:
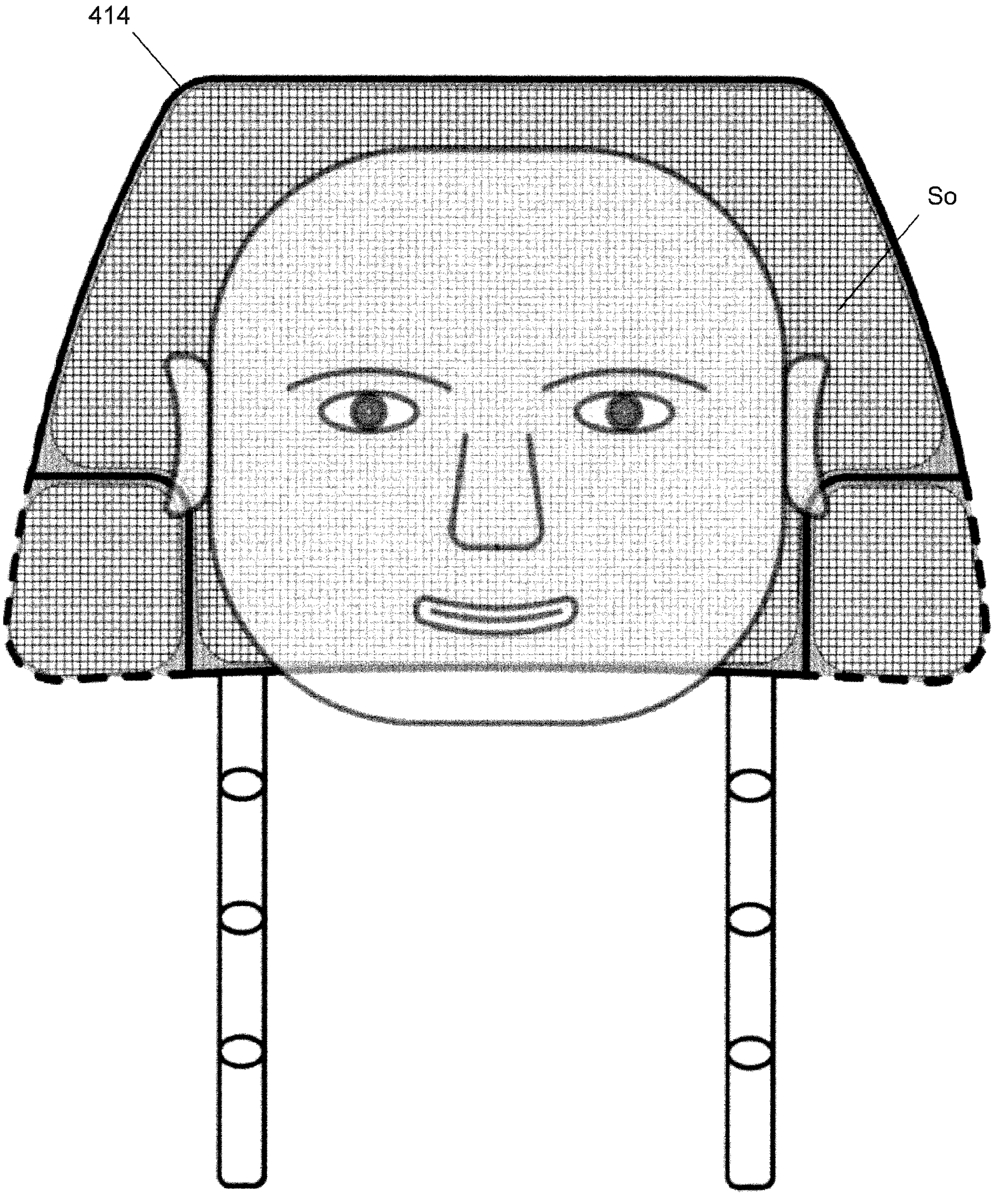

FIGS. 8*a-b* show a second loudspeaker assembly 400 according to the present invention.

Here, FIG. 8*a* shows the second loudspeaker assembly 400 in cross-section, and FIG. 8*b* shows the front face 414 of a headrest 410 of the second loudspeaker assembly 400.

In this example, the mid-high frequency loudspeakers 430*a*, 430*b* are mounted outside of the bass waveguide provided by one or more solid walls 442 of the rigid chassis 440.

In this example, the area So of the forward-facing opening of the bass waveguide is reduced compared with the example of FIG. 7*a*, since the mid-high frequency loudspeakers 430*a*, 430*b* are afforded a separate space in parts of the rigid chassis 440 that do not provide a bass waveguide.

If highly directive (cardioid-like) mid-high frequency loudspeakers are used (e.g. as disclosed in WO2021/185777), it has been found that putting the mid-high frequency loudspeakers in a separate space (outside of the bass waveguide) can help to improve (increase) the directivity of the mid-high frequency loudspeakers at lower frequencies (below ~2 kHz) compared with an equivalent arrangement in which the mid-high frequency loudspeakers are located inside the bass waveguide, albeit at the expense of slightly reducing the area of the front-facing opening of the bass waveguide.

Nonetheless, the area So of the forward-facing opening of the bass waveguide is 340 $cm^2$. In contrast, the area Sd of the first radiating surface of the bass dipole loudspeaker 420 is 170 $cm^2$.

Accordingly, the area of the forward-facing opening So is 2 times larger than the area of the first radiating surface of the bass dipole loudspeaker 420 Sd which, combined with placing the bass dipole loudspeaker 420 towards the rear of the headrest 410, helps the bass dipole loudspeaker 420 to operate at higher SPL levels before encountering "tactile fizzle".

Ultimately, a decision on whether to include the/each mid-high frequency loudspeaker in a bass waveguide and/or in a separate space will depend on design/performance requirements, which may be evaluated in view of the above-discussed factors. In one example (not shown), two sets of mid-high frequency loudspeakers are used. The first set is located inside the bass waveguide and is configured to produce frequencies above 2 kHz hence benefiting from the increased directivity of these frequencies when located inside the bass waveguide. The second set is located in a separate space outside the bass waveguide and are configured to produce frequencies below 2 kHz hence benefiting from the increased directivity of these frequencies when located in a separate space outside the bass waveguide.

Figure 9A:
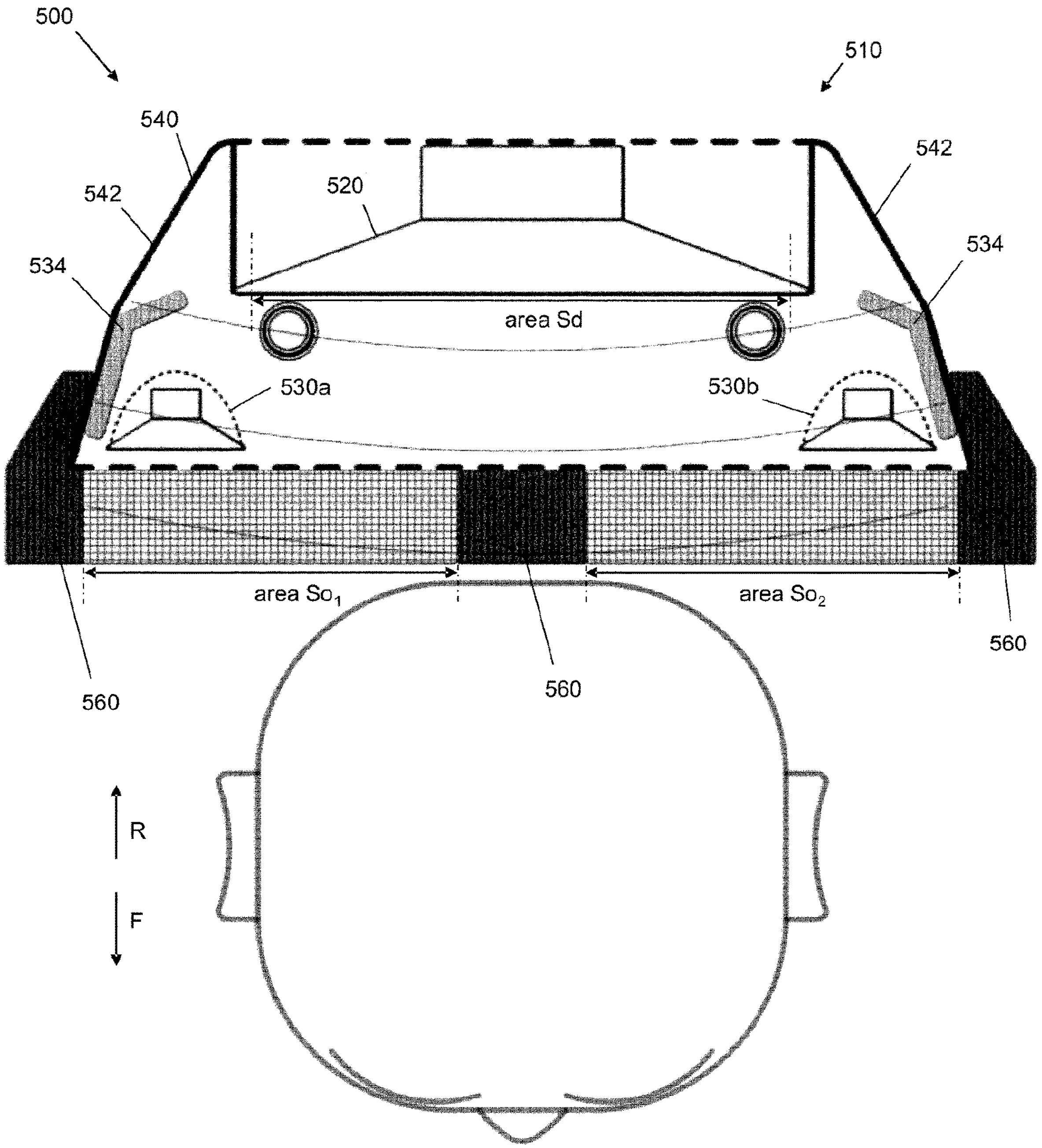
FIGS. 9*a-b* show a third loudspeaker assembly according to the present invention.
Figure 9B:
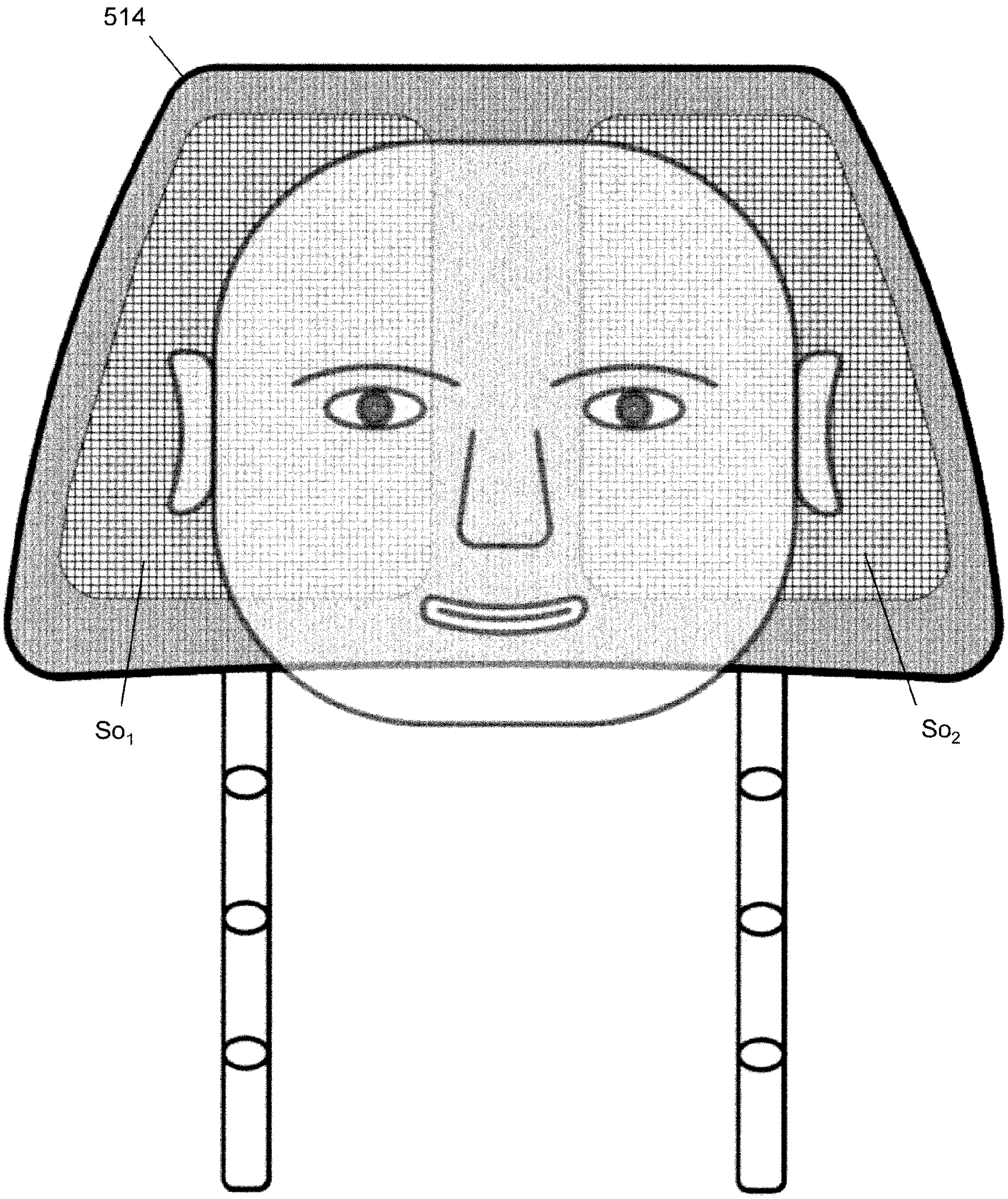

FIGS. 9*a-b* show a third loudspeaker assembly 500 according to the present invention.

Here, FIG. 9*a* shows the third loudspeaker assembly 500 in cross-section, and FIG. 9*b* shows the front face 514 of a headrest 510 of the third loudspeaker assembly 500.

In this example, the bass dipole loudspeaker 520 is forward-facing, with the magnet unit of the drive unit of the bass dipole loudspeaker 520 located rearwards of the second radiating surface. This may help to reduce loudspeaker motor operating noises experienced by the user, since they will be less audible at the front face 514 of the headrest 510. Locating the magnet unit as far as possible from the user may also help to reduce magnetic stray flux reaching the user.

In this example, the bass waveguide is formed by one or more solid walls 542 of the rigid chassis 540, and an additional portion of a non-rigid material which in this example is an open-cell support foam 560 such as polyurethane which may have a specific airflow resistance of 150 Pa·s/m, and thus be closed to bass frequencies but open to mid-high frequencies.

It would also be possible to use, as the support foam 560, an open cell material having a specific airflow resistance higher than 100 Pa·s/m but lower than 500 Pa·s/m, which may be useful if it is desired to have the support foam 560 be open for mid-high frequencies while being closed for bass frequencies (but note that the material does need to be closed to bass frequencies, if it is to serve as part of the bass waveguide).

The one or more solid walls 542 of the rigid chassis 540 and the support foam 560 are configured to guide bass sound produced by the first radiating surface towards two forward-facing openings, at the front face 514 of the headrest 510, having areas $So_1$ and $So_2$. The support foam 560 serves to elongate the bass waveguide and thus increase the distance between the first radiating surface of the bass dipole loudspeaker 520 and the head of a user. The support foam 560 also serves to provide support for the head of the user.

In this example, a porous material 534 may be mounted proximate to each mid-high frequency loudspeaker 530*a*, 530*b*, e.g. to provide absorption of mid-high frequency sound at appropriate locations. The exact location and amount of porous material 534 may be determined based on system/performance requirements. For example, the porous material 534 may be mounted to the solid walls 542 or to a centre of the bass waveguide.

In this example, the combined area So ($=So_1+So_2$) of the forward-facing openings of the bass waveguide is 250 $cm^2$. In contrast, the surface area Sd of the first radiating surface of the bass dipole loudspeaker 520 is 125 $cm^2$.

Accordingly, the area of the two forward-facing openings So is 2 times larger than the surface area of the first radiating surface of the bass dipole loudspeaker 520 Sd which, combined with placing the bass dipole loudspeaker 520 towards the rear of the headrest 510, helps to suppress "tactile fizzle" when the bass dipole loudspeaker 520 operates at higher SPL levels, thereby allowing for more bass SPL without "tactile fizzle".

Figure 10A:
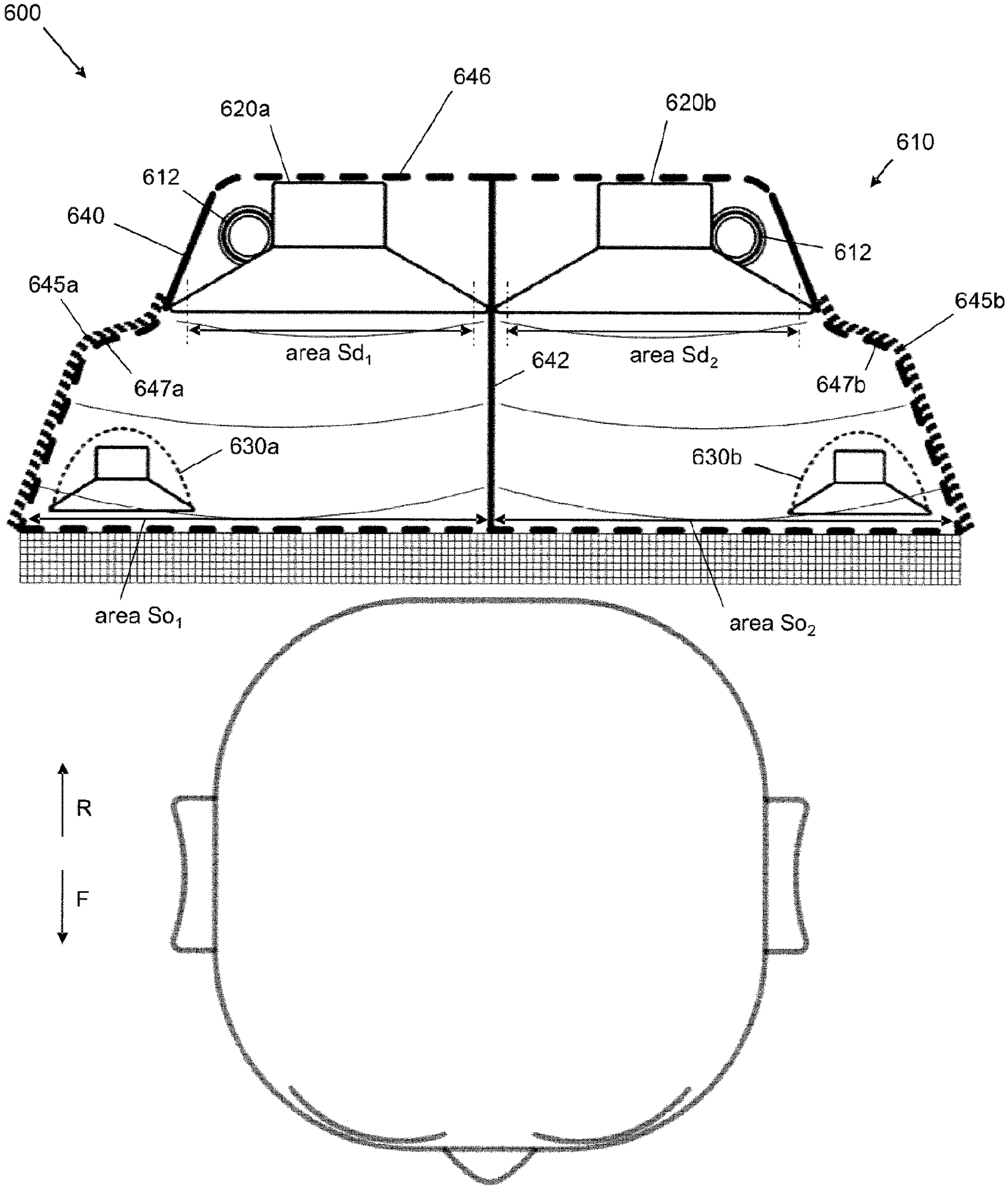
FIGS. 10*a-b* show a fourth loudspeaker assembly according to the present invention.
Figure 10B:
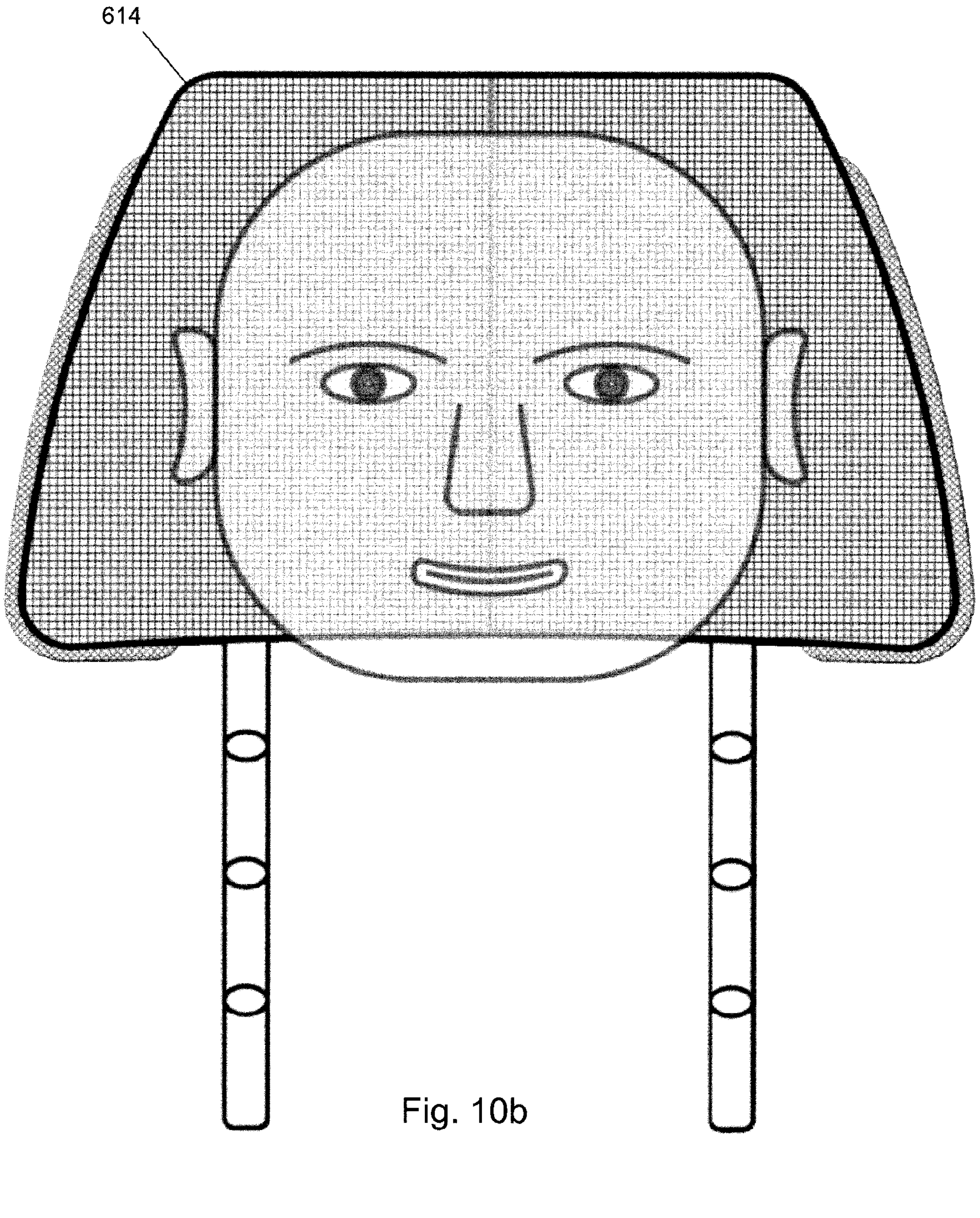

FIGS. 10*a-b* show a fourth loudspeaker assembly 600 according to the present invention.

Here, FIG. 10*a* shows the fourth loudspeaker assembly 600 in cross-section, and FIG. 10*b* shows the front face 614 of a headrest 610 of the fourth loudspeaker assembly 600.

In this example, there is a first bass dipole loudspeaker 620*a* having its own (first) bass waveguide with its own (first) front-facing opening, and a second bass dipole loudspeaker 620*b* having its own (second) bass waveguide with its own (second) front-facing opening. The two bass waveguides are separated by a solid separation wall 642.

Each bass waveguide in this example is provided by walls of the rigid chassis 640.

In the case of the first bass waveguide, the bass waveguide is provided by the solid separation wall 642 and one or more perforated walls 647*a* covered with a portion of non-rigid material 645*a* configured to guide bass sound produced by the first radiating surface towards the at least one forward-facing opening of the bass waveguide.

In the case of the second bass waveguide, the bass waveguide is provided by the solid separation wall 642 and one or more perforated walls 647*b* covered with a portion of non-rigid material 645*b* configured to guide bass sound produced by the first radiating surface towards the at least one forward-facing opening of the bass waveguide.

In order to guide bass sound, the non-rigid material 645*a*, 645*b* covering the walls 647*a*, 647*b* should have a specific airflow resistance larger than 100 Pa·s/m.

Each bass waveguide includes a first mid-high frequency loudspeaker 630*a*, 630*b*. The non-rigid material 645*a*, 645*b* covering the walls 647*a*, 647*b* may has a specific airflow resistance below 500 Pa·s/m, so as to provide acoustic transparency for sound at mid-high frequencies, which will allow the mid-high frequency loudspeakers 630*a*, 630*b* to effectively operate in a free field for the frequencies of sound it produces. Alternatively, the non-rigid material 645*a*, 645*b* may have a specific airflow resistance above 500 Pa·s/m, e.g. if a certain degree of absorption at mid-high frequencies is desired, e.g. to improve the directivity of the mid-high frequency loudspeakers 630*a*, 630*b*.

The separation wall 642 and the use of two bass dipole loudspeakers 620*a*, 620*b* helps to provide channel separation for low frequencies, thereby allowing control of the individual low frequency levels for left and right channels so that, for example, improvements regarding head movement compensations (changing SPL in the left/right channel to account for head movement of a user) can be made more easily.

In this example, the two bass dipole loudspeakers 620*a*, 620*b*, are mounted at or to the rear grille 646, and therefore are mounted at the rear face of the headrest 610. However, in this example, the bass dipole loudspeakers 620*a*, 620*b* are mounted to the headrest 610 in a position that is only partially rearwards of the one or more mounting pins 612, which means that the bass dipole loudspeakers 620*a*, 620*b* could potentially project forward into the head of a user in the event of a crash.

In this example, for the first bass waveguide, the area $So_1$ of the forward-facing opening of the bass waveguide is 200 $cm^2$. In contrast, the surface area $Sd_1$ of the first radiating surface of the first bass dipole loudspeaker 620*a* is 50 $cm^2$.

Accordingly, for the first bass waveguide, the area of the forward-facing opening $So_1$ is 4 times larger than the surface area of the first radiating surface of the first bass dipole loudspeaker 620*a* $Sd_1$ which, combined with placing the first bass dipole loudspeaker 620*a* towards the rear of the headrest 610, helps to suppress "tactile fizzle" when the first bass dipole loudspeaker 620*a* operates at higher SPL levels, thereby allowing for more bass SPL without "tactile fizzle".

The calculations (and effect) are the same for the second bass waveguide, since $So_1=So_2$ and $Sd_1=Sd_2$.

Figure 11A:
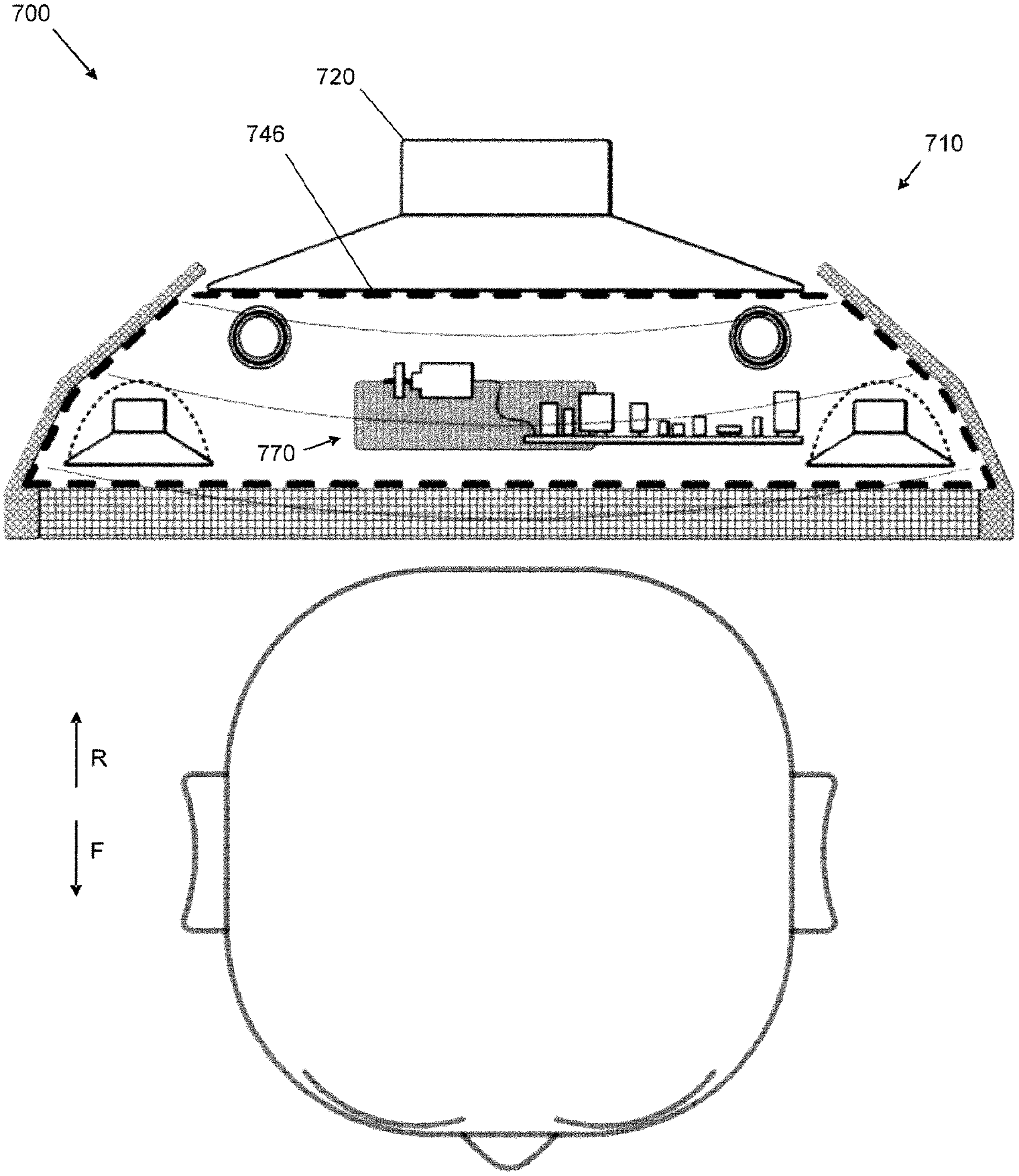
FIGS. 11*a-b* show a fifth loudspeaker assembly according to the present invention.
Figure 11B:
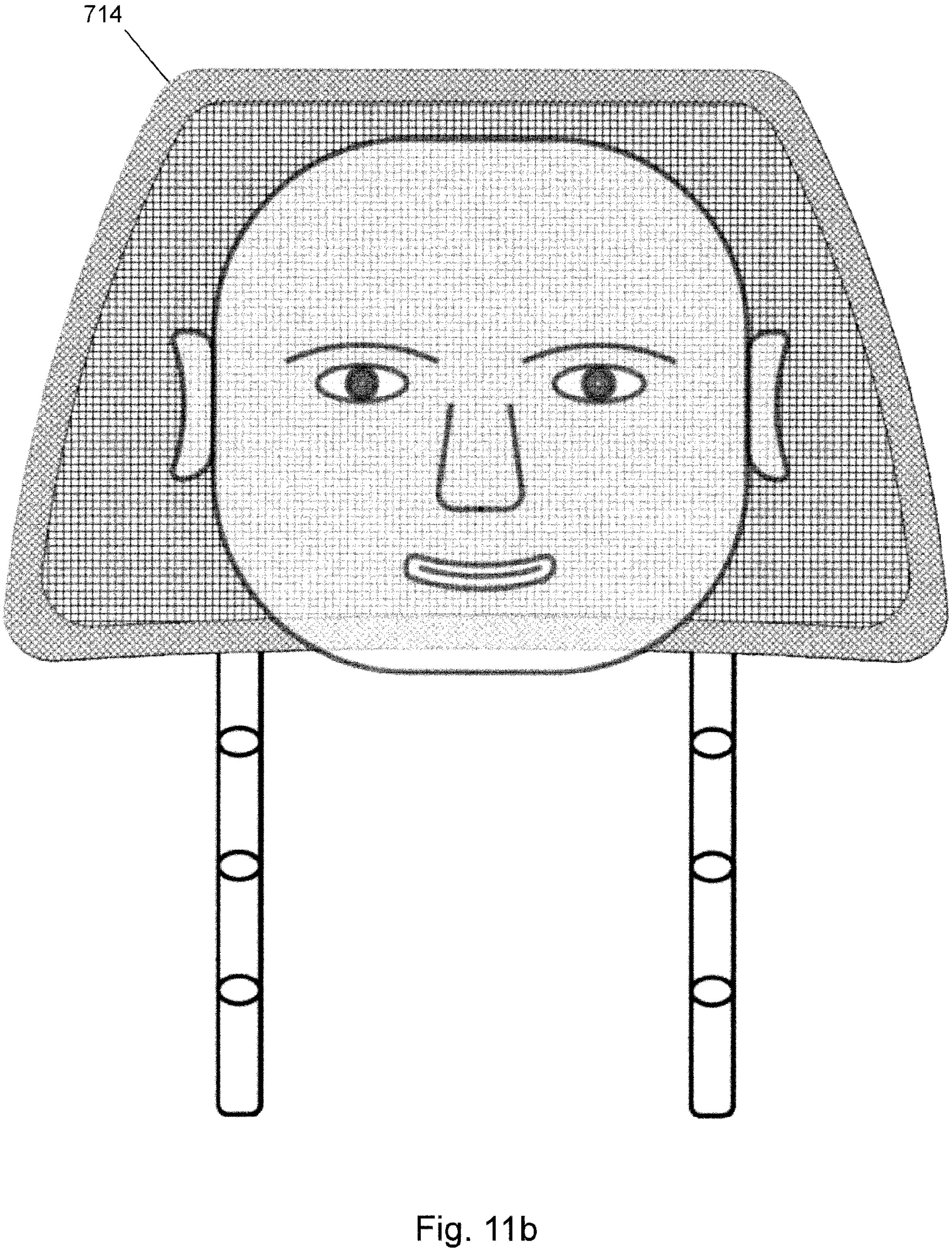

FIGS. 11*a-b* show a fifth loudspeaker assembly 700 according to the present invention.

Here, FIG. 11*a* shows the fifth loudspeaker assembly 700 in cross-section, and FIG. 11*b* shows the front face 714 of a headrest 710 of the fifth loudspeaker assembly 700.

As shown in FIG. 11*a*, in the fifth loudspeaker assembly 700, the bass dipole loudspeaker 720 is now located outside of the bass waveguide, with the bass dipole loudspeaker 720 mounted to the rear grille 746 of the bass waveguide, such that the bass dipole loudspeaker 720 forms part of the rear face of the headrest 710. This makes it possible for easy replacement/repair/modification of the bass dipole loudspeaker 720.

Since the front face 714 of the bass dipole loudspeaker 720 is mounted to the rear grille 746, the at least one rearward-facing opening of the bass waveguide is configured to allow sound produced by the first radiating surface of the bass dipole loudspeaker 720 to propagate into the bass waveguide.

Note that in this example, bass sound produced by the second radiating surface of the bass dipole loudspeaker 720 is able to propagate out from the headrest 710 in the rearwards direction, without the bass waveguide performing any guiding of the bass sound produced by the second radiating surface.

Because the bass dipole loudspeaker 720 is located outside of the bass waveguide in this example, this has freed up some space within the bass waveguide. In this example, the bass waveguide now accommodates one or more components 770 of the loudspeaker assembly 700 in a space between the first radiating surface of the diaphragm and the front face 714 of the headrest 710. These components 770 may be electronic boards, amplifiers, shakers, motors for headrest positioning or massaging function or ventilation, etc.

Figure 12:
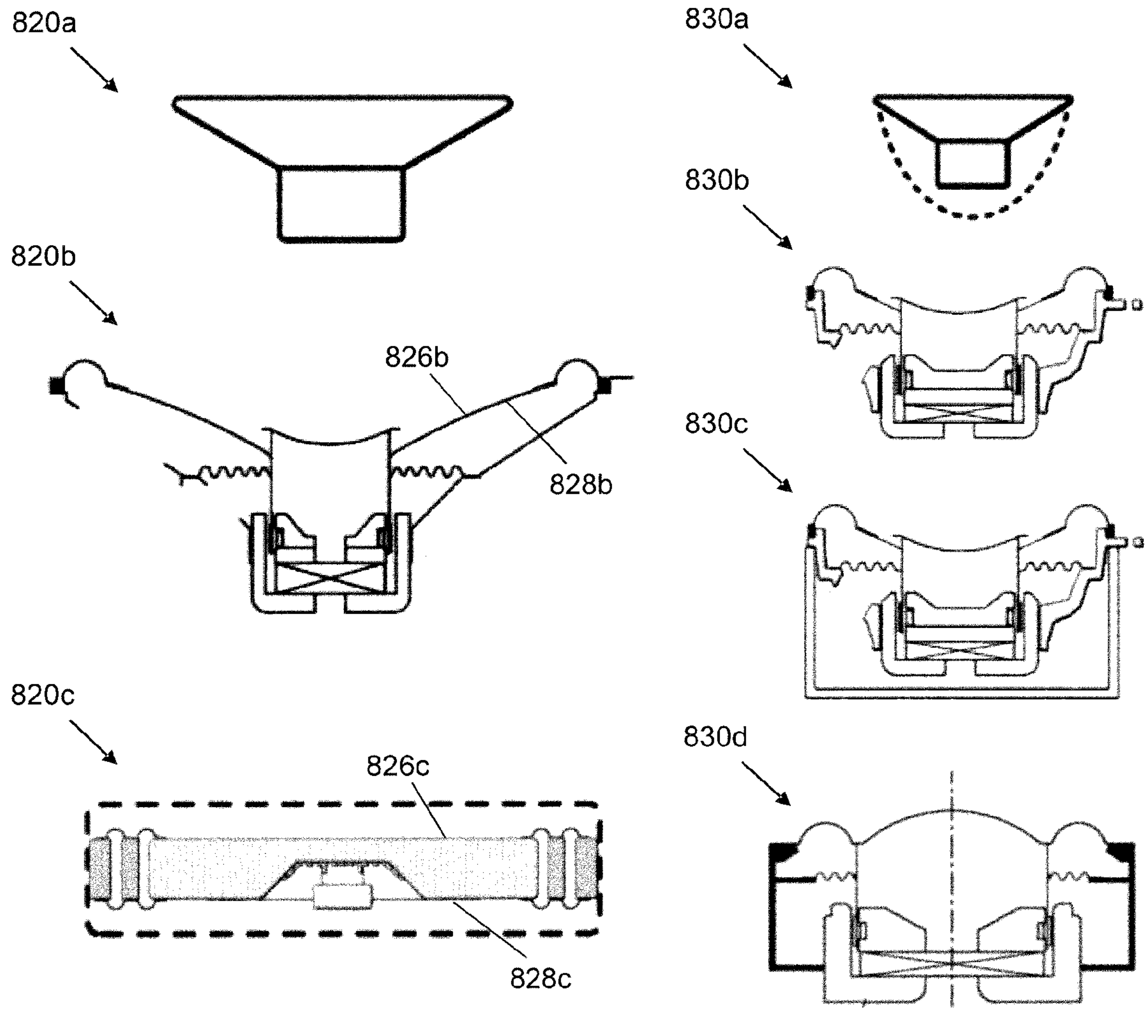
FIG. 12 shows a non-exhaustive selection of loudspeaker forms that could be used in the loudspeaker assemblies disclosed herein.

FIG. 12 shows a non-exhaustive selection of loudspeaker forms that could be used in the loudspeaker assemblies disclosed herein.

In the example loudspeaker assemblies shown herein, the bass dipole loudspeaker is always illustrated in the form of bass dipole loudspeaker 820*a*, as shown in FIG. 12.

In some examples, it would be possible to use a traditional cone loudspeaker 820*b* (with an open rear, so that it acts as a dipole) as shown in FIG. 12 as the bass dipole loudspeaker 820*a*.

In other examples, it would be possible to use an alternative form of bass dipole loudspeaker, such as the bass dipole loudspeaker 820*c* as shown in FIG. 12, as the bass dipole loudspeaker 820*a*. The alternative form of bass dipole loudspeaker may be taken from some of the documents discussed in the background section. The particular bass dipole loudspeaker 820*c* as shown in FIG. 12 is a bass dipole loudspeaker as disclosed in WO2019/121266 (see FIG. 10*a* and corresponding explanation thereof), but many other potential forms of bass dipole loudspeaker are possible, e.g. as disclosed in WO2019/121266 and other documents discussed in the background section.

The particular form of bass dipole loudspeaker is not relevant to this invention, though we have for completeness labelled a first radiating surface 826*b*, 826*c* and a second radiating surface 828*b*, 828*c* on each of the bass dipole loudspeakers 820*b*, 820*c*.

In the example loudspeaker assemblies shown herein, the mid-high frequency loudspeaker is always illustrated in the form of mid-high frequency loudspeaker 830*a*, as shown in FIG. 12.

In some examples, it would be possible to use a mid-high frequency loudspeaker 830*b* without a housing as the mid-high frequency loudspeaker 830*a*.

In some examples, it would be possible to use a mid-high frequency loudspeaker 830*c* in a closed box that will act substantially as a monopole as the mid-high frequency loudspeaker 830*a*.

In other examples, it would be possible to use an alternative form of mid-high frequency loudspeaker, such as the mid-high frequency loudspeaker 830*d* as shown in FIG. 12, as the mid-high frequency loudspeaker 830*a*. The particular mid-high frequency loudspeaker 830*d* as shown in FIG. 12 is a highly directive (cardioid-like) mid-high frequency loudspeaker as disclosed in WO2021/185777 (see FIG. 5 and corresponding explanation thereof), but many other potential forms of bass dipole loudspeaker are possible, e.g. as disclosed in WO2021/185777 and other documents discussed in the background section.

Any of the above-described loudspeaker assemblies may be incorporated into a seat, e.g. with the headrest of the loudspeaker assembly serving as a headrest of the seat. In such arrangements, the seat may be configured to position a user who is sat down in the seat such that the head of the user is located in front of the front face of the headrest.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

WO2019/121266

PCT/EP2021/064765

PCT/EP2021/068397

WO2021/185777

GB2112473.0

"Dynamical Measurement of the Effective Radiating area SD", Klippel GmbH (https://www.klippel.de/filead-min/klippel/Files/Know_How/Application_Notes/AN_32_Effective_Radiation_Area.pdf).

The invention claimed is:

1. A loudspeaker assembly including:

a headrest having a front face facing in a forwards direction and a rear face facing in a rearwards direction, wherein the rearwards direction is opposite to the forwards direction, wherein the headrest is for use with a user's head located in front of the front face of the headrest;

a bass dipole loudspeaker mounted to the headrest, wherein the bass dipole loudspeaker includes a drive unit and a diaphragm, wherein the diaphragm has a first radiating surface and a second radiating surface, wherein the first radiating surface and the second radiating surface are located on opposite faces of the diaphragm, wherein the drive unit is configured to move the diaphragm at bass frequencies such that the first and second radiating surfaces produce sound at bass frequencies;

a bass waveguide configured to guide bass sound produced by the first radiating surface out from the front face of the headrest via at least one forward-facing opening provided by the bass waveguide, wherein the bass dipole loudspeaker is mounted to the headrest such that bass sound produced by the second radiating surface is able to propagate out from the rear face of the headrest;

wherein the bass dipole loudspeaker is mounted to the headrest such that the first radiating surface of the diaphragm is, when the diaphragm is at rest, closer to the rear face of the headrest than to the front face of the headrest;

wherein the area of the at least one forward-facing opening is at least 1.5 times larger than the area of the first radiating surface as projected onto a plane perpendicular to a movement axis of the bass dipole loudspeaker.

2. The loudspeaker assembly according to claim 1, wherein the area of the at least one forward-facing opening of the bass waveguide is at least 2 times larger than the area of the first radiating surface.

3. The loudspeaker assembly according to claim 1, wherein the area of the first radiating surface of the bass dipole loudspeaker as projected onto a plane perpendicular to a movement axis of the bass dipole loudspeaker is 80 $cm^2$.

4. The loudspeaker assembly according to claim 1, wherein the headrest includes one or more mounting pins for mounting the headrest to a seat, and the bass dipole loudspeaker is mounted to the headrest in a position that is rearwards of the one or more mounting pins.

5. The loudspeaker assembly according to claim 1, wherein the headrest includes a rigid chassis, wherein the bass waveguide is formed at least in part by the rigid chassis.

6. The loudspeaker assembly according to claim 5, wherein the rigid chassis includes one or more solid walls configured to guide bass sound produced by the first radiating surface towards the at least one forward-facing opening of the rigid chassis.

7. The loudspeaker assembly according to claim 5, wherein the rigid chassis includes one or more perforated walls, covered with a portion of non-rigid material configured to guide bass sound produced by the first radiating surface towards the at least one forward-facing opening of the bass waveguide.

8. The loudspeaker assembly according to claim 5, wherein the at least one forward-facing opening of the rigid chassis is covered by a front grille that is configured to allow bass sound to propagate therethrough substantially uninhibited.

9. The loudspeaker assembly according to claim 1, the bass waveguide includes one or more portions of a non-rigid material configured to guide bass sound produced by the first radiating surface towards the at least one forward-facing opening of the bass waveguide, wherein the one or more portions of non-rigid material are formed of a material having a specific airflow resistance that is 100 Pa·s/m or higher.

10. The loudspeaker assembly according to claim 9, wherein the specific airflow resistance of the one or more portions of non-rigid material is 500 Pa·s/m or lower.

11. The loudspeaker assembly according to claim 1, wherein the headrest includes one or more mid-high frequency loudspeakers.

12. The loudspeaker assembly according to claim 11, wherein the/each mid-high frequency loudspeaker is located within the bass waveguide.

13. The loudspeaker assembly according to claim 1, wherein the loudspeaker assembly has two or more bass dipole loudspeakers, wherein each bass dipole loudspeaker shares the same bass waveguide, wherein the area of the at least one forward-facing opening is larger than the sum of the areas of each first radiating surface of a respective bass dipole loudspeaker as projected onto a respective plane perpendicular to a movement axis of that respective bass dipole loudspeaker.

14. The loudspeaker assembly according to claim 1, wherein, if there is one bass dipole loudspeaker included in the loudspeaker assembly, the area of the first radiating surface of the bass dipole loudspeaker as projected onto a plane perpendicular to a movement axis of the bass dipole loudspeaker is 100 $cm^2$ or more, and if there is more than one bass dipole loudspeaker included in the loudspeaker assembly, the sum of the areas of each first radiating surface of a respective bass dipole loudspeaker as projected onto a respective plane perpendicular to a respective movement axis of that respective bass dipole loudspeaker is 100 $cm^2$ or more.

15. A seat assembly that comprises:

a seat for seating a user, wherein the seat includes a headrest having a front face facing in a forwards direction and a rear face facing in a rearwards direction, wherein the rearwards direction is opposite to the forwards direction, wherein the headrest is for use with a user's head located in front of the front face of the headrest; and a loudspeaker assembly including:

a bass dipole loudspeaker mounted to the headrest, wherein the bass dipole loudspeaker includes a drive unit and a diaphragm, wherein the diaphragm has a first radiating surface and a second radiating surface, wherein the first radiating surface and the second radiating surface are located on opposite faces of the diaphragm, wherein the drive unit is configured to move the diaphragm at bass frequencies such that the first and second radiating surfaces produce sound at bass frequencies;

a bass waveguide configured to guide bass sound produced by the first radiating surface out from the front face of the headrest via at least one forward-facing opening provided by the bass waveguide, wherein the bass dipole loudspeaker is mounted to the headrest such that bass sound produced by the second radiating surface is able to propagate out from the rear face of the headrest;

wherein the bass dipole loudspeaker is mounted to the headrest such that the first radiating surface of the diaphragm is, when the diaphragm is at rest, closer to the rear face of the headrest than to the front face of the headrest;

wherein the area of the at least one forward-facing opening is at least 1.5 times larger than the area of the first radiating surface as projected onto a plane perpendicular to a movement axis of the bass dipole loudspeaker;

wherein the seat is configured to position a user who is sat down in the seat such that the head of the user is located in front of the front face of the headrest with the head of the user being located within 30 cm from the front face of the headrest.

* * * * *